(12) United States Patent
Moreno

(10) Patent No.: US 6,882,269 B2
(45) Date of Patent: Apr. 19, 2005

(54) SYSTEM AND METHOD FOR REMOTELY COORDINATING THE SECURE DELIVERY OF GOODS

(75) Inventor: Eli Moreno, Takoma, WA (US)

(73) Assignee: Darren Murrey, Tacoma, WA (US)

( * ) Notice: Subject to any disclaimer, the term of this patent is extended or adjusted under 35 U.S.C. 154(b) by 440 days.

(21) Appl. No.: 09/905,383

(22) Filed: Jul. 12, 2001

(65) Prior Publication Data

US 2002/0035515 A1 Mar. 21, 2002

Related U.S. Application Data

(60) Provisional application No. 60/218,400, filed on Jul. 14, 2000.

(51) Int. Cl.[7] .................. G05B 19/00; G08B 13/14; G06K 15/00; G06F 17/60
(52) U.S. Cl. .................. 340/5.73; 340/568.1; 340/569; 235/383; 705/1
(58) Field of Search ................ 340/5.73, 5.2, 340/5.7, 568.1, 569; 235/375, 380, 381, 382, 383

(56) References Cited

U.S. PATENT DOCUMENTS

| | | | | | |
|---|---|---|---|---|---|
| 4,894,717 | A | * | 1/1990 | Komei | .................. 348/150 |
| 5,223,829 | A | * | 6/1993 | Watabe | .................. 340/5.73 |
| 5,475,378 | A | * | 12/1995 | Kaarsoo et al. | ............ 340/5.73 |
| 5,744,053 | A | | 4/1998 | Kaimai | .................. 340/568 |
| 5,946,660 | A | * | 8/1999 | McCarty et al. | ............ 705/5 |
| 6,085,170 | A | * | 7/2000 | Tsukuda | .................. 705/26 |
| 6,138,910 | A | | 10/2000 | Madruga | .................. 235/383 |
| 6,204,763 | B1 | * | 3/2001 | Sone | .................. 340/568.1 |
| 6,300,873 | B1 | * | 10/2001 | Kucharczyk et al. | .... 340/568.1 |
| 6,323,782 | B1 | * | 11/2001 | Stephens et al. | ........... 340/5.73 |
| 6,344,796 | B1 | * | 2/2002 | Ogilvie et al. | ............. 340/5.73 |
| 6,404,337 | B1 | * | 6/2002 | Van Till et al. | ........... 340/568.1 |

OTHER PUBLICATIONS

U.S. Appl. No. 60/198,387.*
U.S. Appl. No. 60/161,927.*

* cited by examiner

Primary Examiner—Brian Zimmerman
Assistant Examiner—Clara Yang
(74) Attorney, Agent, or Firm—Miller Nash LLP

(57) ABSTRACT

A system and process for securing goods delivered to and retrieved from a secure storage unit is provided. The system utilizes a locker having an interior into which at least one good may be inserted and secured by a door via a locking mechanism. Access to the interior of the locker is controlled by a server which is in communication with the locker via an Internet or other network connection. The server controls the accessing and operation of the locker either directly or in combination with a controller. The controller is suitably situated in a kiosk that provides user interfaces by which customers, vendors, and/or carriers access and utilize the locker. The locker may be any suitable storage container including garages, mailboxes, heated/cooled compartments, and other storage units. The kiosk may also include other vending machines and dispensing devices, the operation of which are preferably controlled by the server.

48 Claims, 38 Drawing Sheets

SHOPPERBOX NETWORKS

MEMBER | SHIPPING | CUSTOMER SERVICE | ABOUT US | HELP | JOIN

LOG OUT

SHIPPING

Figure 1:
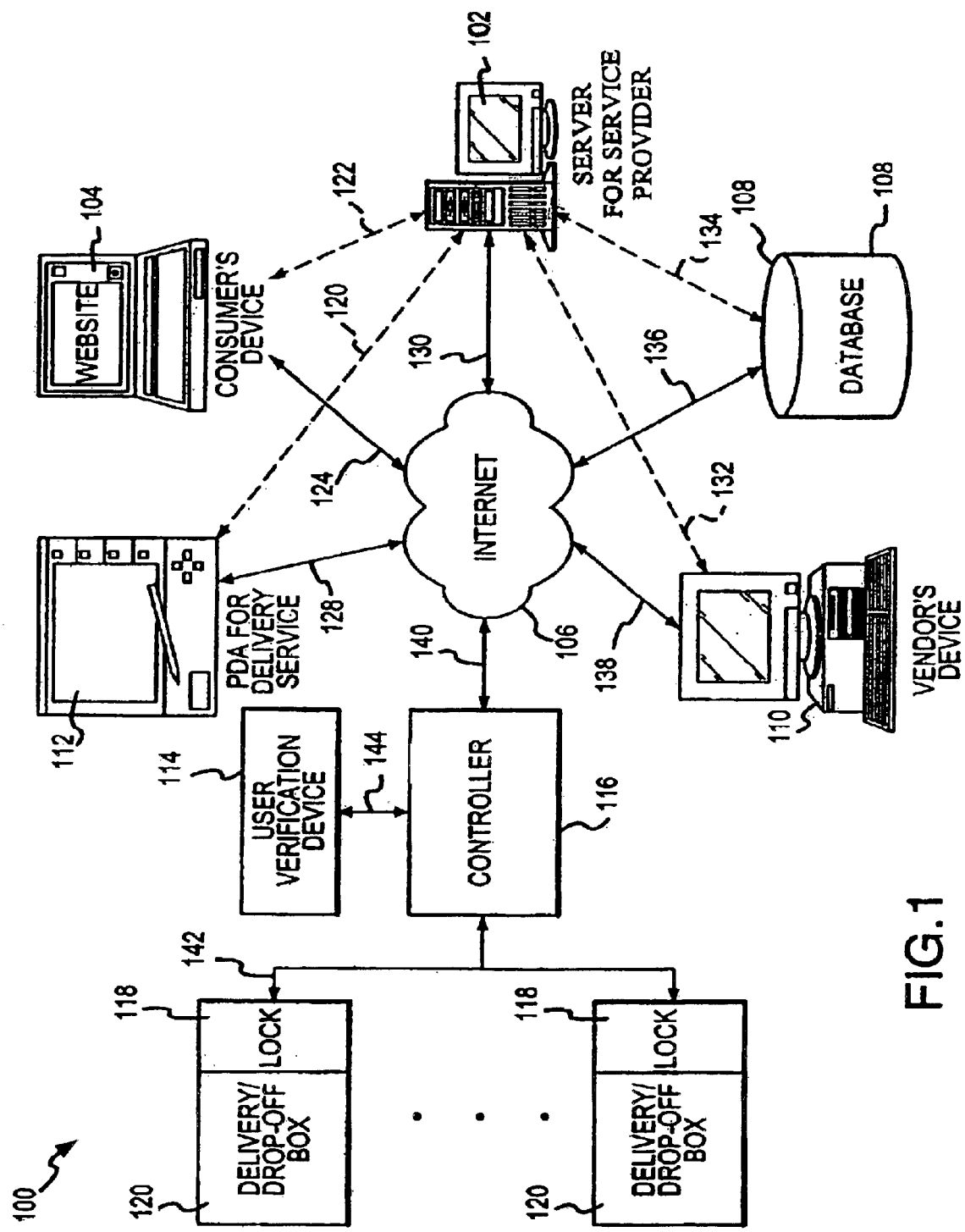

SHIPPING
TRACK PACKAGES
SHIPPING QUOTE

SHOPPERBOX NETWORKS SHIPPING

TERMS AND CONDITIONS FOR USING DELIVERY EXPRESS:

DELIVERY EXPRESS, INC. ONLY SHIPS PACKAGES WITHIN THE STATE OF WASHINGTON. SPECIFICALLY, DELIVERY EXPRESS INC. ONLY SHIPS PACKAGES TO AND FROM PIERCE COUNTY, KING COUNTY, AND SNOHOMISH COUNTY.

YOUR SHIPMENT MUST WEIGH LESS THAN 50 LBS AND BE NO LARGER THAN 18 INCHES WIDE BY 18 INCHES TALL BY 18 INCHES DEEP.

SHIPMENTS PROCESSED BY THE SHOPPERBOX BY 10AM ON A BUSINESS DAY WILL BE DELIVERED THE SAME DAY BY 6:00 PM. SHIPMENTS PROCESSED BY THE SHOPPERBOX AFTER 10 AM (AND BEFORE 12 MIDNIGHT) WILL BE DELIVERED BY 12:00 PM THE FOLLOWING BUSINESS DAY. BUSINESS DAYS ARE MONDAY THROUGH FRIDAY FROM 7:30 AM TO 5:30 PM (IN THE STATE OF WASHINGTON).

EACH PACKAGE MUST HAVE THE COMPLETE RETURN AND DESTINATION ADDRESSES INCLUDING ZIP CODES, A CONTACT NAME, AND A CONTACT PHONE NUMBER.

DELIVERY EXPRESS INC. WILL NOT ACCEPT HAZARDOUS, FLAMMABLE, OR CORROSIVE MATERIALS. DELIVERY EXPRESS INC. WILL NOT ACCEPT FIREARMS OR ILLEGAL SUBSTANCES OF ANY KIND. DELIVERY EXPRESS INC. CANNOT ACCEPT SHIPMENTS THAT ARE NOT PACKAGED SUFFICIENTLY TO BE TRANSPORTED SAFELY WITH PROPER CARE. SHIPMENTS ARE UNDERSTOOD TO HAVE A VALUE LESS THAN $25. DELIVERY EXPRESS INC. WILL NOT BE RESPONSIBLE FOR INCIDENTAL DAMAGE.

I AGREE | DO NOT AGREE

FIG. 7D

SHOPPERBOX NETWORKS

WE DELIVER ANYTIME!

| MEMBER | SHIPPING | CUSTOMER SERVICE | ABOUT US | HELP | JOIN |

LOG OUT

SHIPPING

SHIPPING
TRACK PACKAGES
SHIPPING QUOTE

SHOPPERBOX NETWORKS SHIPPING

TO SHIP A PACKAGE COMPLETE THE ADDRESS INFORMATION BELOW. FIELDS MARKED WITH A RED ASTERISK (*) ARE REQUIRED.

SHIP TO:

| Field | Value |
|---|---|
| *NAME: | MONTY ABBOTT |
| COMPANY: | SHOPPERBOX NETWORKS |
| *STREET ADDRESS: | 3009 MCCARVER ST |
| ADDRESS 2: | |
| *CITY: | TACOMA |
| *STATE: | WASHINGTON |
| *POSTAL CODE: | 98403 |
| PHONE: | (253) 383-3125 |
| E-MAIL: | mabbott@shopperbox.com |

YOU'VE SELECTED DELIVERY EXPRESS

DELIVERY EXPRESS

[CONTINUE->]

FIG. 7E

PRINT THIS LABEL BY SELECTING PRINT FROM THIS WINDOW'S FILE MENU.

CUT HERE
------------------------------------------------

DELIVERY
EXPRESS

ALL DAY SERVICE

FROM

MONTY ABBOTT
2602 WESTRIDGE AVE W
A101
TACOMA, WA 98402

FROM PHONE: 253-383-3125

TO

MONTY ABBOTT
SHOPPERBOX NETWORKS
30 MCCARVER ST
TACOMA, WA 98403

TO PHONE: (253) 383 - 3125

FIG.7K

SHOPPERBOX
WE DELIVER ANYTIME! NETWORKS

[MEMBER] [SHIPPING] [CUSTOMER SERVICE] [ABOUT US] [HELP] [JOIN]

| LOG OUT | SHOPPERBOX NETWORKS SHIPPING |
|---|---|
| SHOPPERBOX NEWS | THANK YOU FOR USING DELIVERY EXPRESS AND SHOPPERBOX NETWORKS. |
| DHL WORLDWIDE EXPRESS TO OFFER CARRIER SERVICES TO SHOPPERBOX LOCATIONS | YOU WILL RECEIVE AN E-MAIL CONFIRMATION OF THIS TRANSACTION. YOUR SHIPPING ORDER ID IS 256. PLEASE MAKE A NOTE OF THIS NUMBER. YOU WILL NEED TO HAVE THIS NUMBER AVAILABLE TO COMPLETE THE SHIPPING PROCESS. |
| DELIVERY EXPRESS TO PROVIDE SAME DAY SERVICES | TO COMPLETE THE SHIPPING PROCESS, PLACE YOUR PACKAGE(S) IN THE SHOPPERBOX AT YOUR LOCATION. |
| SHOPPERBOX ANNOUNCES ASIAN EXPANSION | NOTE: YOUR PACKAGE WILL NOT BE SHIPPED UNTIL YOU PLACE IT INTO THE SHOPPERBOX COMPARTMENT. |
| | CLICK HERE TO SHIP ANOTHER PACKAGE. |
| | CLICK HERE FOR INSTRUCTIONS ON HOW TO COMPLETE THE SHOPPERBOX NETWORKS SHIPPING PROCESS. |
| | CLICK HERE TO RETURN TO THE SHOPPERBOX NETWORKS HOME PAGE. |
| | CLICK HERE TO LOG OUT OF SHOPPERBOX NETWORKS |

FIG.7L

SYSTEM AND METHOD FOR REMOTELY COORDINATING THE SECURE DELIVERY OF GOODS

This application claims the benefit of Provisional Application No. 60/218,400, filed Jul. 14, 2000.

FIELD OF THE INVENTION

The present invention relates to the field of secure delivery systems which utilize, coordinate, deliver and securely store goods at a location remote from the merchant of such goods. The present invention allows a customer to request the delivery of goods from a vendor, and coordinates the delivery of these goods to a secure locker from which the goods can be retrieved by the customer, at his or her convenience.

BACKGROUND OF THE INVENTION

The acceptance of the Internet for commercial transactions by the public has afforded tremendous opportunities for new and existing companies in the fields of merchandising and delivery. The customer is now faced with the pleasant challenge of being able to select a wide variety of goods and services that include books, music, compact discs, videotapes, clothing, food, medicine, and prepared meals via a personal computer or similar electronic device. Customers are often able to place an order at their convenience, and arrange for payment and delivery, often without human intervention by the vendor.

Many companies are striving to use the new Internet technology to revive older types of sales and service franchises. In particular, home delivery of perishable food products invokes the memory of the old milk and egg or ice delivery systems popular until the middle of this century. Other companies merchandise general products like books, compact discs, clothing, videotapes, and small household items. Typically the merchants use a general-purpose shipper to complete the delivery step, like the United Parcel Services (UPS®), the U.S. Postal Service® (the "mail"), and FedEx®. Another category of delivery service firms are those that perform routine errands for people, for example, the pick-up and delivery of dry cleaning.

A critical aspect of order fulfillment is the actual placing of goods in the customer's hands. In many cases, the delivery location is specified by the customer, but the actual delivery date and time are specified by the deliverer. In many other cases, the customer can make a specific appointment with a particular vendor for a shipment receipt within a certain specified delivery time window: for example, "on Tuesday, March 16, between 3:00 p.m. and 3:30 p.m." However, these types of delivery services are often not available, or are more expensive, or are interrupted due to unplanned changes in either the delivery service or the customer's schedule.

Modern consumers are challenged by busy work and social schedules and often do not have the time or opportunity to arrange for the personal delivery or pickup of items at times convenient to both the merchant and the customer. This is especially the case with delivery systems such as the mail and UPS which often deliver only during normal business hours, when the customer is also working. Since delivering personal items at a work location is often undesirable, impractical, and impossible, many customers can not conveniently receive goods via delivery systems currently available.

Various solutions to these problems in conveniently delivering goods and services have been attempted. Generally, these solutions only address the delivery aspect of the purchase/fulfillment circle and require the customer to be present at a more opportune time. Such solutions often do not address the vendor's or the delivery service's needs to reduce and/or eliminate missed deliveries, concerns with theft, payment considerations, receiver authorizations, and various other concerns. In the simplest case, for a locally furnished item, the customer may often elect to pick-up the product at the merchant's or shipper's location. Typical examples include dry cleaners, and going to a will-call window or a receiving dock. Other solutions include specifying precise delivery locations and time windows when the customer is at a specific location (for example, pizza delivery services). All of these solutions, however, inherently contain inefficiencies for the customer, the vendor, and/or the delivery service.

Therefore, a system is needed which enables a customer to specify a delivery or pick-up of goods while allowing a vendor and/or delivery service to schedule the pick-ups/deliveries based upon their schedules and needs and not necessarily based upon a particular customer's needs or availability. Additionally, such a system reduces deliverer and vendor concerns with payment by not having to carry cash or make change, while also maximizing a delivery service's utilization of resources by eliminating subsequent delivery attempts. The system would also minimize the amount of time a customer has to wait to receive specific goods and/or services, and eliminate the need for the customer to personally wait to sign for a delivery. The system should provide opportunities for merchants to accumulate and schedule related deliveries and to offer marketing opportunities for increasing business to others (i.e., to the areas of delivery).

SUMMARY OF THE INVENTION

According to the present invention, a system and method for aggregating customer orders and delivery fulfillment requirements is provided. The system and method utilizes a storage unit which contains a plurality of individual lockers. The lockers may be of varying sizes, and configurations, and may provide heating, cooling, and other environmental features. In one embodiment, the storage unit includes a kiosk that is coupled to a server which allows a customer to place an order for the delivery or pick-up of goods. However, in other embodiments, a kiosk is not utilized and instead a controller associated with the lockers is utilized. The server also allows a merchant to identify those customers or potential customers to whom additional bargains, offers, or promotions may be made. By aggregating the demand for a given good at particular locations, the vendor is able to lower delivery costs and offer a discount to the customer.

The system and method of the present invention further enables vendors, delivery services, and customers with a system that allows them to reserve lockers in advance, from a remote location, for example via a wireless communications device. By reserving the lockers, vendors and deliverers are assured that a receptacle for delivering or receiving an order will be available on a specific date, at a specific time, thereby eliminating the need to return to a location because of a missed delivery. Further, the system supports the dynamic allocation of lockers, thereby allowing multiple users to utilize a given number of lockers on an as needed and/or as available basis. Additionally, customers will be assured by the present invention that their delivered goods will be at their designated location, on a specific date in a secure receptacle until they can arrive to claim the goods.

BRIEF DESCRIPTION OF THE DRAWING FIGURES

FIG. 1 provides a schematic representation of a first embodiment of a system utilized to provide the various features and functions of the present invention.

Figure 2:
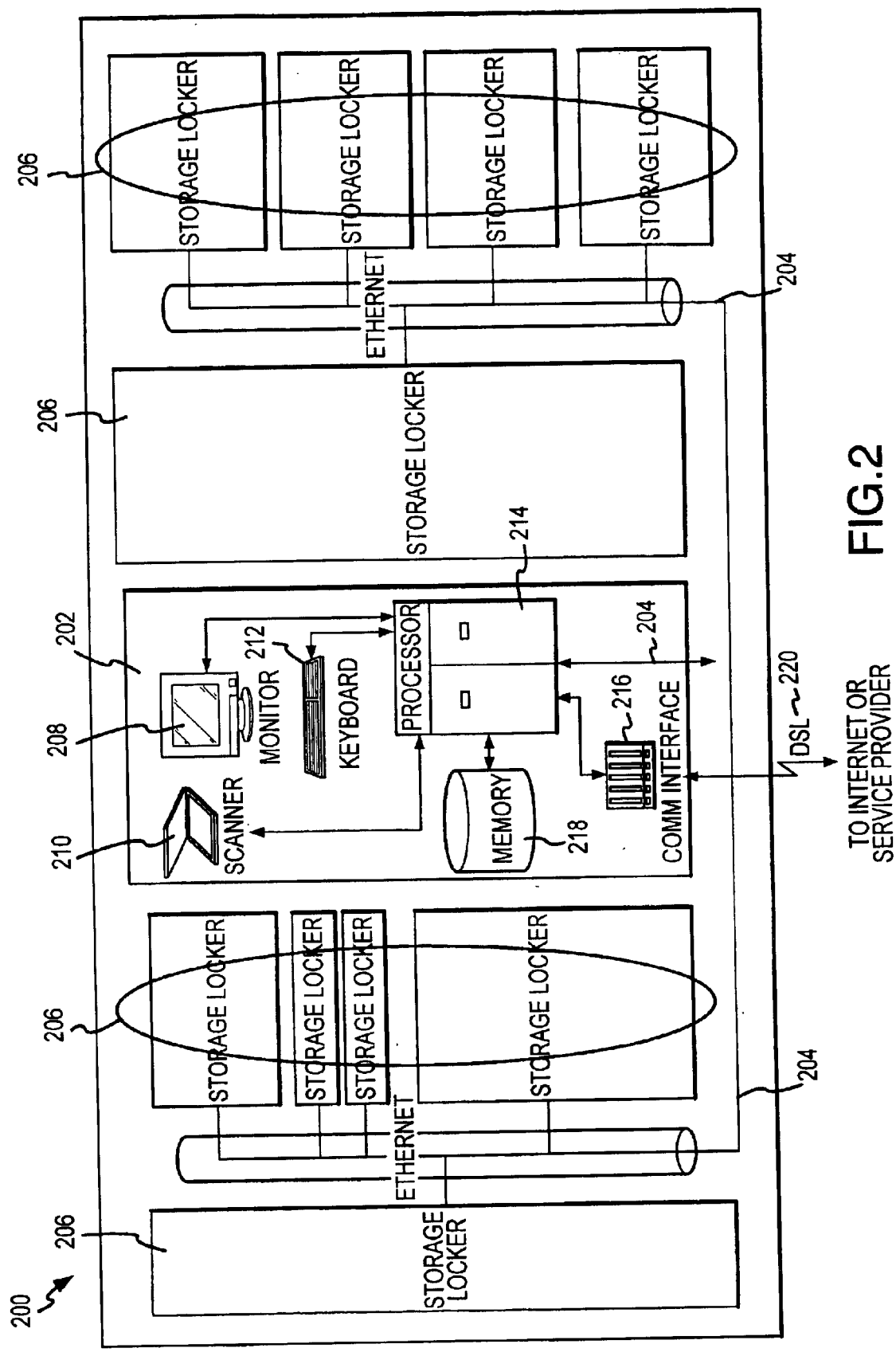

FIG. 2 provides a schematic representation of an embodiment of a storage unit utilized in the present invention.

Figure 3:
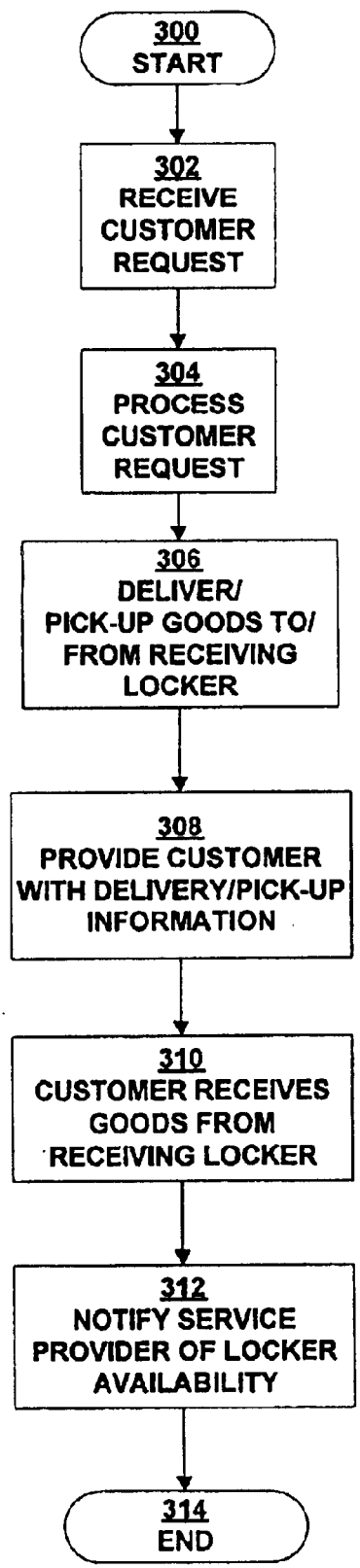

FIG. 3 provides a flow diagram illustrating a methodology utilized in at least one embodiment of the present invention.

Figure 4:
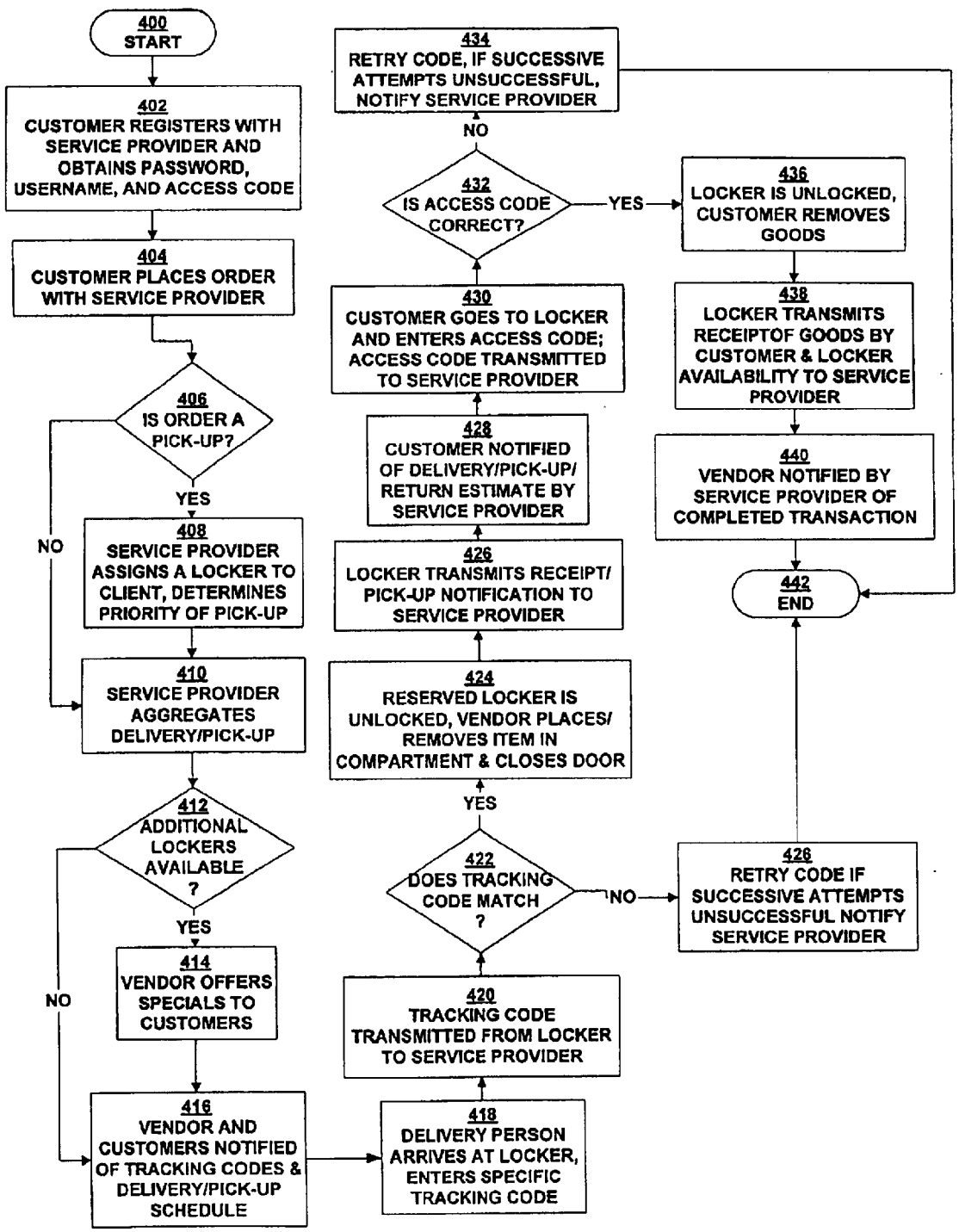

FIG. 4 provides a flow diagram illustrating another embodiment of the methodology utilized by the present invention.

FIGS. 5A–5J provide a series of screen displays presented to and utilized by a carrier to interface with the system for the delivery and pick-up of goods at lockers for one embodiment of the present invention.

FIGS. 6A–6F provide a series of screen displays presented to and utilized by a customer to interface with the system and retrieve a good inserted into a locker for one embodiment of the present invention.

FIGS. 7A–7N and 7P–7R provide a series of screen displays presented to and utilized by a customer to request a locker in which to insert a good for a pick-up by a carrier and/or a vendor for one embodiment of the present invention.

Figure 8:
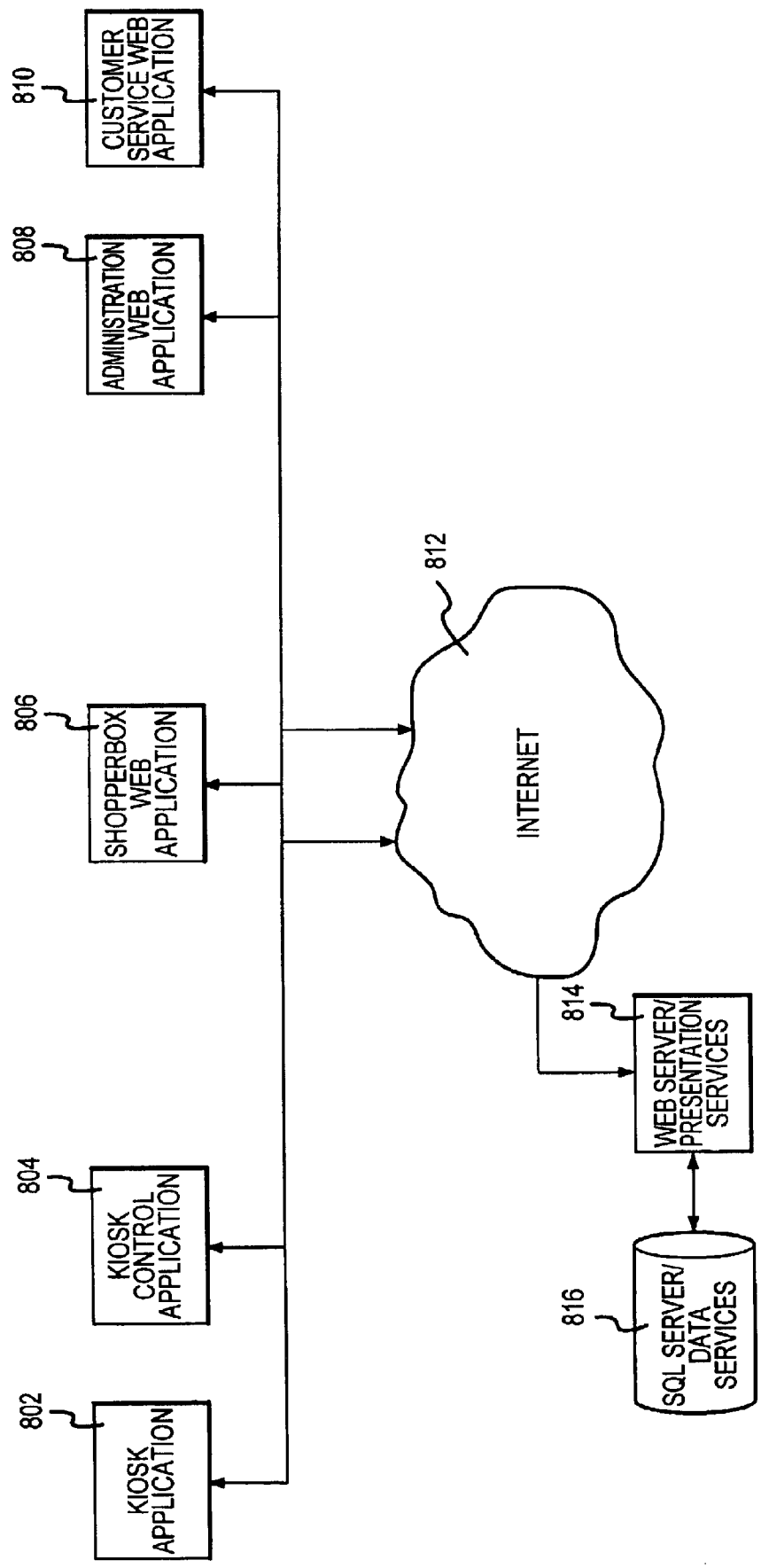

FIG. 8 is a schematic representation of the various applications utilized by one embodiment of the present invention to interface with the users, the server, and the locker.

DETAILED DESCRIPTION OF THE INVENTION

The present invention facilitates the secure storage and subsequent transfer of goods (which may include serviced goods) from a first entity (e.g., a vendor) to a second entity (e.g., a customer). Throughout this description the term "customer" or "consumer" shall herein be defined to include any person or entity to whom a transfer of goods is to be accomplished via the present invention. As such, a commercial entity receiving goods from another commercial entity via the system may be considered to be a "consumer". Similarly, the term "vendor" shall herein be defined to include any person or entity from whom a transfer of goods is to be accomplished via the present invention. Thus, a private person returning goods to a manufacturer might be considered to be a "vendor". Further, the term "carrier" shall be defined to include any entity who transfers goods from the system to a third location, for example, UPS or FedEx. Further, in certain situations, it is appreciated that an entity may be both a vendor and a carrier (for example, a pizza delivery service is both the vendor and the carrier). Lastly, the term "user" is herein defined to be any person or entity who utilizes the system to receive or transfer goods and, based upon the context of such use, a "user" may be a customer, a vendor and/or a carrier. Thus, it is to be appreciated that the present invention facilitates the secure transfer and/or storage of goods from a vendor to a customer via a carrier.

One embodiment of a system for facilitating the transfer of goods from a vendor to a customer is shown in FIG. 1. As shown, the system 100 includes at least one "locker" 120, having an interior, in which the goods are stored. The lockers 120 are connected to a controller 116, which via a server 102, controls the operation of and access to the lockers 120. Further, the controller 116 receives inputs from a user verification device 114 over a communications link 144. Signals from the user verification device 114 are utilized by the system 100 to determine to whom, when, and where access to a locker 120 is to be provided.

Additionally, the server 102 provides centralized implementation of all of the data and content utilized by the system 100 to provide and perform the various features and functions specified herein below. Such data and content is suitably retrieved from a database 108 in communication with the server, for example, via an Internet connection 136 or a direct connection 134. Additionally, the system 100 enables consumers and vendors to specify parameters, features, and functions related to a given or a group of delivery and storage needs via appropriate Internet connections 124, and 138, respectively, or via direct connections 122 and 132, respectively, with the server 102. Such connections 122, 124, 132 and 138 may utilize any communications links, protocols, systems, processes, and devices commonly known in the art.

Further, remote consumer and/or vendors devices such as a Personal Data Assistant (PDA) 112, cell phone or similar device may be utilized to communicate with the server 102 over direct 120 or Internet 128 connections. Each of these components of the system are described in greater detail below. Additionally, it is to be appreciated that while this embodiment includes the above mentioned components, other embodiments may utilize fewer or additional components as specific implementations require.

Referring again to FIG. 1, the system 100 permits any number, size, shape and type of locker to be utilized. The determination as to which locker to provide in a given application of the system 100 is based upon specific needs and wants. As such, it is to be appreciated that variations of lockers 120 may occur within the scope of the present invention. In its most basic form, each locker 120 provides an enclosure in which a vendor may insert and securely store goods until a customer, directly or through a third party, is able to receive the goods. As such, for purposes of this description, the term "locker" shall be construed to include any device or structure which is suitable for securely storing goods of any size, shape, fungibility (i.e., capable of providing environmental or other specialized features), or any other characteristic. As such, the system 100 is not limited to and may include any size, shape or configuration of lockers. Further, a locker 120 may be utilized by itself or in combination with other lockers, which may also be of a different size, shape, configuration and features. Examples of the numerous variations of a locker 120 contemplated by the present invention include, but are not limited to, a garage (for example, one used to securely store an automobile, furniture, or other large item), a mailbox used to store parcels or letters (for example, one provided by FedEx®), a mobile locker (e.g., a shipping container or U-Haul® vehicle/trailer which is capable of being transported to a designated address for subsequent on-site storage of goods), a single compartment locker, a multiple compartment locker, a refrigerated locker for holding perishable items, a heated locker (for example, for storing delivered pizza), a self-sterilizing locker, and a clothing locker (for example, for storing dry cleaning).

It is to be appreciated that the list of variations and combinations of features supportable by the lockers of the system 100 are infinite and therefore can not be expressly identified herein. As such, the present invention contemplates any device, structure, system or method for storing goods as being within the purview of a locker 120.

Further, as explained in greater detail herein below, it is to be appreciated that the locker 120 may be located at any location desired, and is not to be construed as being limited to lockers located at a private residence, an apartment complex or similar dwelling. The locker 120 may be provided, for example, within a vendor's or a delivery service's facility (for example, in a grocery store). Further, the locker 120 may be provided at a centralized location (for example, at a MailBoxes Etc.® location) or at any other location where secure delivery of goods is desired (for example, a construction site, an airport, a transit terminal, or a business).

Additionally, the locker 120 may include any security feature or function desired to efficiently and securely store delivered goods. Such security features and functions may include, but are not limited to, providing public and secure access points to the interior of a locker, providing alarm and monitoring functions, providing locking mechanisms, and any other specialized security features and functions which may be desired based upon the characteristics of goods to be stored in the locker, the location of the locker, the time of day, the frequency of use of the locker, or any other variable.

One example of such specialized security features is providing access into the locker from both inside and outside a house or other structure. For example, a dry cleaner might provide a locker which allows a customer to retrieve their clothes after normal business hours. Such a locker might include a rotating clothes line that rotates a customer's clothes into a locker, from which the customer, upon the entry of the customer's access code, may retrieve the clothes, while an automatically controlled interior door prohibits access to the remainder of store. For such an embodiment, only one locker might be needed to service the dry cleaner's numerous customers after business hours.

Another example of a security feature supported by the lockers 120 is the use of remotely or automatically controlled locks 118. Such locks 118 may be utilized to secure access through a door to a compartment within which a given good is temporarily stored. It is to be appreciated that such locks 118 may include an electronically activated lock such as a MalLok® or TraveLok®, both of which are manufactured by SmartLok®. Various other types of locks are also available and may be suitably utilized by the system 100 to secure a locker 120 and provide controlled access to the interior thereof including, for example, hydraulic, electrical, magnetic, electro-magnetic, electro-mechanical and/or mechanical locks.

More specifically, when electronic locks are utilized, a solenoid, mechanical locking mechanism, and electronic firing board are utilized. Further, a door latch position sensor is utilized to determine when a locker is forced open and provides an indication thereof to the controller 116, which then emits the appropriate alarm signal locally and/or to the server 102. Similarly, the position sensor can also be utilized to determine whether a user has correctly opened and/or closed a locker, after having received access thereto. As such, this configuration enables the controller 116 to control and monitor access to a locker 120. Further, it is to be appreciated that the system is not limited to a specific lock or set of locks, or even electrically activated locks (e.g. solenoid), and various other locking systems may be utilized in the system 100 of the present invention.

As shown in FIG. 2 (with reference to corresponding components in FIG. 1), multiple lockers 206 (120) of various size, shape and configuration may be combined into a storage unit 200. Regardless of the number of lockers 206 (120) utilized, a communications link 204 (142) connects each locker 206 (120) with a controller/processor 214 (116) situated in a kiosk 202. The communications link 204 (142) is preferably an Ethernet link. However, in other embodiments, a serial link, a networked connection, or similar connectivity may also be utilized to connect a locker 206 (120) with the processor 214 (116). Those skilled in the art appreciate that each component connected to an Ethernet, serial and/or network connection is suitably identified by a unique address and that such addresses may be added, modified and/or deleted, as necessary, without affecting addresses for other nodes on the network. Further, since an Ethernet or similar connection is utilized to provide control signals from the controller 214 (116) to an individual locker, lockers may be added/removed as desired without having to reconfigure the system or operation of an existing locker 206 (120) or a storage unit 200 and by merely assigning/deleting an Ethernet or serial address to the added/removed lockers 206 (120).

Additionally, while a wired connection is illustrated in FIGS. 1 and 2, it is to be appreciated that electromagnetic, wireless, fiber optic, infrared, satellite, and other connections may be utilized to connect a locker 206 (120) with a controller/processor 214 (116). Further, it is to be appreciated that combinations of wired and/or wireless links may be utilized to connect given lockers 206 (120) with a controller/processor 214 (116).

With reference again to FIG. 1, access to each locker 120 is controlled by a controller 116. The controller 116 may be any device capable of performing the features and functions identified herein. In certain applications, for example, the kiosk approach shown in FIG. 2, the controller/processor 214 is provided via a personal computer or other computer workstation. In other embodiments, various other control devices may be utilized, for example, a programmable logic controller, a micro-controller, a micro-processor, or other controllers utilized in devices such as, but not limited to, a PDA, an Automated Teller Machine (ATM), or any other device which facilitates local control via communications received from a centralized server 102.

Further, instead of one local controller, for example, in a kiosk, controlling multiple lockers, the functions of the controller may also be implemented by a combination of local controllers with at least one remote centralized server. In such an embodiment, controllers may be associated with each or a certain number of lockers 120, which are then controlled via a remote connection (for example, one provided over an Internet connection) with the centralized server 102 (for example, an Application Service Provider). As such, the present invention preferably utilizes a local controller 116 in combination with a centralized server 102 to provide the features and functions specified herein.

Additionally, the controller/processor 116 may be co-located with the lockers 120 which it is controlling (for example, as shown in FIG. 2). However, it is to be appreciated that the controller 116 may also be remotely located relative to the lockers 120, the locks 118, and/or the user verification device 114. For example, the system 100 may be configured such that a centrally located controller 116 controls access to numerous boxes 120, for example, distributed throughout an apartment complex, via the communications link 142 (which, as discussed previously, may be wired or wireless). In such an embodiment, each of the lockers or groups of lockers is suitably accessible via a user verification device 114, which similarly may establish a wired or a wireless communications link 144 with the controller 116, the server 102 and/or a locker 120 (which contains a suitable interface). In such an embodiment, a customer may access a locker 120, upon entry of the appropriate access code (or similar identifier), without physically visiting a centralized controller or kiosk (for example, one located at a manager's office for the apartment complex). As such, for large scale operations, such as a large apartment complex in which numerous lockers 120 are located throughout the complex, only one controller 116 may be needed to control access to the lockers 120.

Referring now to FIG. 2 and as mentioned previously, one embodiment of the present invention utilizes a kiosk 202 connected to at least one locker 206 via an Ethernet connection 204 and further connected to the server (not shown) via a Digital Subscriber Link 220 or similar connection. In this embodiment, the kiosk 202 utilizes a personal computer to provide many of the features and functions of the present invention. As is commonly appreciated, a personal computer/computer workstation includes a processor 214, a memory 218, a communications interface 216 (i.e., a modem or network card), a display monitor 208, and often a user interface/verification device, for example a keyboard 212 and/or a scanner 210 (user verification devices are discussed in greater detail herein below). Further, appropriate power is provided to the kiosk via an uninterruptible power supply providing backup power for a given time period. In the embodiment shown in FIG. 2, back-up power is provided for 20 minutes, however, longer and/or shorter periods may be provided as needed with the addition/subtraction of batteries, generators and/or other system commonly known in the art.

Further, it is to be appreciated that the kiosk 202 may come in varying sizes, shapes, configurations and utilize various components and accessories. As specific needs require, various functional components may be added, deleted or substituted within the kiosk 202 as desired. For example, a relatively non-complex kiosk might exclude a monitor and instead only have a card reader. Similarly, the keyboard may be excluded and instead a scanner 210 (retinal, fingerprint, voice) may be used to determine a user's identity and/or access authorizations. Similarly, various other data input and output devices may be utilized including, but not limited to, speakers, LCD panels, touch screen displays, magnetic card readers, video cameras, printers, infrared data transceivers, and bar code scanners. As such, the kiosk 202 may include any components in any configuration desired and is not limited to those components and/or accessories shown in FIG. 2 and/or described herein.

When a personal computer is utilized as the controller, as provided for in the embodiment shown in FIG. 2, the processor 214 controls, based upon commands received from the server 102, the unlocking and locking of the lockers 206. As such, the processor 214 is preferably capable of multi-tasking and similar operations such as those commonly provided by an Intel 80XXX series processors, Pentium processors, AMD Celeron processors and similar devices. However, single process (i.e., non-multi-tasking) controllers/processors may also be utilized with the system, those skilled in the art appreciating the various trade-offs that may occur in system cost, system speed, adaptability, expandability, capabilities and performance.

Additionally, the processor 214 may also be configured to monitor and/or control (independent of or in conjunction with the server 102) environmental conditions, safety and security features, and perform other functions. For example, the storage unit 200 may be equipped with fire suppression systems, fire alarms, smoke detectors, video monitors (for example, web cameras), and/or burglar or intrusion alarms. Similarly, the controller may be part of a larger system and/or the kiosk providing other features including, but not limited to, dispensing cash (for example, an ATM), dispensing articles of commerce (including, but not limited to, stamps, soft drinks, snack foods, and personally use products) and other operations. Further, it is to be appreciated that such articles of commerce may be dispensed to a user by the system via a separate vending machine or one suitably integrated into the kiosk and controlled by the system. It is to be appreciated that such other operations may be suitably controlled and monitored by the processor 206, kiosk 202, the server 102 and/or other servers (for example, when being utilized as an ATM, the processor may establish a communications link with a third party server). Similarly, the processor 214 may also be utilized to provide payment acceptance features, wherein the kiosk 202 (through a suitable interface device) accepts payment for goods delivered to the box.

As mentioned previously, the kiosk 202 in the embodiment shown in FIG. 2 utilizes a personal computer that includes a memory 218. The memory 218 may be any standard data storage device utilized in personal computers, computer workstations, and/or similar devices. Those skilled in the art appreciate that such data storage devices include disk hard drives, floppy drives, CD ROMS, DVD drives, tape drives and other forms of magnetic, optical and other data storage mediums. Such devices may be removable and/or non-removable and are available in varying sizes, processing speeds and other parameters. Any suitable memory may be utilized, with particular applications determining the characteristics of such memory device.

In the embodiment shown in FIG. 2, the memory is co-located with the processor 214 in the kiosk 202. However, it is to be appreciated that the memory 218 may also be remotely located of the processor 214 and that depending upon the tasks and responsibilities assigned to the processor 214 varying sizes of memory 218 may be utilized. For example, a kiosk 202 that is utilized to dispense mailing labels or receive payments, while also monitoring the premises for safety and security concerns would most likely utilize a larger memory than a kiosk 202 that merely accepted and communicated user identification information to the server 102 and unlocked/locked lockers upon receipt of associated commands from the server 102.

Further, in the embodiment shown in FIG. 2, the memory 218 suitably stores operating software for controlling the kiosk 202 (i.e., the software code utilized to control the unlocking of lockers and communications with the server 102). Additionally, in this embodiment, the memory 218 also stores the application software utilized by the processor 214 to interface with a user (i.e., user interface software). The memory 218 also contains kiosk monitoring software which is utilized by the processor 214 to report problems and sends alerts (for example, system malfunction or an attempted forced entry into a locker) to the server 102.

The kiosk 202, as mentioned above, also includes a communications interface 216 which facilitates the establishment of communications between the processor 214 and the server 102. In the embodiment shown in FIG. 2, a Digital Subscriber link 220 is utilized to communicate, via the Internet 106, with the server 102. Alternative embodiments utilize a cable modem (with appropriate digital cable connection), telephone line (with an analog connection) and/or wireless modem to establish communications between the processor 214 and the server 102.

Further, as mentioned hereinabove, the kiosk 202 and/or any of the components or functions provided thereby (for example, the processor, memory, display, and the like) need not be physically located with the kiosk 202 and/or the lockers 206. It is to be appreciated that the Ethernet connection (or other connection to the lockers) may be further connected via another network (for example, the Internet) to a remote processor 214. Further, such a remote processor 214 may also be configured and located with the server 102 such that access control to a locker is provided by the server with or without the use of a kiosk 202 located at or near a given set of lockers 206.

The kiosk 202 also includes a display 208. Utilizing SVGA touchscreen interfaces, the display 208 may operate as both a data output device and a data input device. The utilization of the display 208 in such a manner is described further herein below with reference to FIG. 5. However, non-touchscreen interface displays may also be utilized in various embodiments of the present invention. Other output devices, such as printers and speakers, are also supported by the present invention. The printers may be utilized to print receipts, mailing labels, maps, directions, and other information.

Further, other user verification interfaces/devices are supported by the kiosk 202. Such interfaces include keyboards 212, keypads, mouse, trackballs and scanners 210. Scanners include, but are not limited to, devices that scan documents, x-ray like devices that scan an environment, those that determine a user's identity and/or authorization based upon scans of retinas, fingerprints, voices, signatures, and other biometric indicators as well as non-biometric indicators such as smart cards, debit cards, credit cards, and bar codes. Additionally, payment systems may also be included in the kiosk 202 including credit/debit card readers, change machines, software processes for directly billing to an account, E-checks, Cash on Delivery (COD) compatible systems, and other forms of payment systems, all of which are well known in the art.

Referring again to FIG. 1, user interface/verification devices 114 may also be situated local or remote to the locker 120 and/or the controller 116. The communications link 144 between the user verification device 114 and the controller 116 may be a wired or a wireless link. The user verification device 114 also need not be a dedicated unit. Instead, various remote control devices (such as, a garage door opener, PDA, and a wireless telephone) may be utilized to establish a communications link and/or provide the access code (or user identifier) over a wireless link to the controller 116. Therefore, the access and control features of the system 100 may be provided without requiring a dedicated controller 116 or a dedicated user verification device 114 for each locker 120 or group of lockers.

Further, in other embodiments, the system 100 may also utilize electrical, electromagnetic or infrared connections between a PDA, a carrier's DIAD board or other device capable of communicating a user name, password, access code or similar identifier, and/or other information to the server 102 directly or via the controller 116. Further, it is to be appreciated that such devices may be utilized singularly or in combination with other devices to provide the necessary interactions between the controller and a given user. Additionally, access codes and other user identifiers may also be suitably encrypted or transmitted in plain text.

Referring still to FIG. 1 and as mentioned previously, the controller 116 is connected via the Internet 106 and communications links 140 and 132 to a server 102 (or in certain embodiments, to a vendor or carrier's server). The communication links 140 and 130 may be wired or wireless. The server 102 provides the software and hardware necessary to provide the various features and functions of the system 100 discussed herein and those functions commonly performed by a server. In this embodiment, the server 102 utilizes a Microsoft Windows NT based system, however, other computer systems and operating systems providing comparable or better functions and capabilities may be utilized. Such systems and platforms are well known in the art and are not discussed further herein.

The server side implementation of the present invention, when desired, enables content for each installation of a kiosk and/or lockers to be customized from the central site without having to update software on individual basis. In the embodiments discussed herein, however, each kiosk is assigned a unique ID, which when a user session is initiated, is passed to the server 102. Based upon the received kiosk ID, the server 102 determines which authentications to use, which graphics and/or advertising to present to a user, which lockers are available at the location, what features/ capabilities are available and other parameters associated with operating the kiosk and utilizing lockers associated therewith. Further, this configuration enables the server to update each kiosk's software modules from the central server on a global, group, and/or individual basis, as desired, because screen displays and other software modules are downloaded from the server 102 versus being stored in the memory 218 associated with the processor 214 or kiosk 202.

The server 102 is suitably connected to a database 108 via either a direct communications link 134, an Internet link 136, or both. The server 102 may also be connected to multiple databases (for example, one for each community). The database 108 stores customer and vendor information including password, sign-on, access codes, locker locations, web pages, and any other information necessary to control access and/or identify users.

Similarly, the system 100 includes connections (via the Internet or directly) between the server 102 and consumer's device 104, devices utilized by carriers or delivery services 112, and vendor's device 110. The communications links may be wired or wireless. Additionally, any device capable of establishing a connection with the server 102 directly or via the Internet may be utilized by the system 100 for receiving web pages and similarly formatted and/or communicated information. Further, the consumer's device 104 might, in certain embodiments, include a personal computer or a PDA or an Internet equipped telephone. Similarly, the vendor's device 110 might be a computer workstation or a second server while the carrier/delivery service may utilize encrypted or non-encrypted wireless telecommunications links to mobile units (for example, delivery trucks). As such, the system 100 is not limited to any specific devices or configurations for communicating with the server 102 in order to access/secure the delivery of goods by a vendor to a customer via a locker.

Referring now to FIG. 3, one embodiment of a process by which a customer utilizes the system 100 and/or storage unit 200 to receive and/or drop-off goods for delivery/pick-up is illustrated. As shown for this embodiment, the process begins when a customer communicates a request for goods/ services (Block 302) to a system implementing the invention. As mentioned previously with regards to the various embodiments described herein, the customer's request may be communicated to an implementing system via a variety of devices and communications links. For example, a customer requesting the delivery of groceries from an online grocery store may submit a request via a web page. Alternatively, a customer wishing to notify a movie rental chain that a movie is ready for return to their store and is going to be dropped into a return locker, may utilize a bar code reader, provided in a kiosk, to scan the movie and then drop the VHS cassette into a video return slot provided in a locker. In such a situation, the customer might be considered as having returned the movie on-time without having to actually drive to the movie rental store. Additionally, since the movie rental chain is notified, at the time of return, which movie is being returned, the chain may then notify customers on a wait-list that the desired movie is available. In certain embodiments, the locker might even be equipped to dispense the movie at the return box to another customer (for example, one in the same apartment complex or community) without requiring the movie rental chain to fetch, rewind, and restock the movie. Therefore, various other methods and systems for notifying a service provider that a customer requests goods/services may be utilized. The system and methodology of the present invention is not limited to any specific embodiments, hardware, or processes.

After the customer request has been received by the service provider, the request is then processed (Block 304). Depending upon the type of request, and the nature of the goods/services requested, this processing may encompass numerous steps or very few and may require contacting third party vendors, carriers, and others. As such, the present invention is not to be construed as being limited to any specific request processing methodology and may encompass various processes. For example, the request for the delivery of groceries may entail contacting a grocery provider, taking delivery of the groceries at the service provider's facility, or storing the groceries at the store, arranging delivery of the groceries, and determining which grocery delivery containers need refrigeration (recyclable containers could be utilized, for example, with a deposit credited to the customer's account upon return of the containers to a locker). In contrast, a request for a delivery of a pizza may require making the pizza, preheating the heated locker, and delivering the pizza to the locker.

Next, the process continues with delivering the goods/service to the locker, or in the case of a return item or a laundry request, picking-up the goods from the locker. (Block 306) Depending upon the vendor providing the goods/services, delivery may be obtained by a designated deliverer, by a commercial deliverer (UPS, FedEx, the mail, etc.), or by another entity (for example, by the service provider who receives the goods from the vendor and then delivers the goods to the appropriate lockers).

Once delivery/pick-up of the goods is accomplished, a system implementing the process notifies the customer of the delivery (Block 308). At this time, additional information may be provided to the customer. For example, a customer dropping off laundry for the dry cleaner may be notified when his dry cleaning will be returned. Similarly, for returned goods, the notification may include a tracking number, estimated repair time, or any other information. The customer may be notified of such information by any communications systems or methods known including, but not limited to, e-mail, page, telephone call, letters, audio and/or visual messages provided by the kiosk, and web postings.

When the service includes the delivery of goods, the process continues with the customer receiving the goods from the locker (Block 310). The process allows a customer to remove goods from the locker within a pre-set time period from entering the access code. In this manner, the customer is not prohibited from retrieving the goods when the locker is inadvertently closed before all of the goods are removed. At this point, a transaction is completed—the customer has requested and taken delivery of the requested goods. Depending upon the billing arrangements desired, the present invention may be configured to require pre-payment, payment at time of receipt (for example, by swiping a credit card through a card reader provided on the kiosk prior to allowing access to the locker), or payment upon inspection (i.e., the customer's credit card is automatically billed within a fixed time period upon opening a locker). Such a feature might be desired when ice cream is melted or a pizza cold, or clothes wrinkled, due, for example, to a delivery or locker failure. The system might also be provided free of charge, or subject to a minimal membership fee, to the customer or community member, with the vendor and/or delivery services bearing any other charges or costs.

Once the customer has removed the goods from the locker, the server is notified by the kiosk or controller that the locker is now available (Block 312). At this point, the process reconfigures any systems utilized for the finished request (for example, turns off heating/cooling, ventilation, security systems, or the like), as applicable, and then repeats itself, assigning lockers for the delivery or pick-up of goods, and unassigning lockers upon completion of the requested activity. Additionally, when a locker is commonly utilized for storing goods needing refrigeration/heating/ventilation such systems may not be turned off between every event, as desired by the local needs and conditions.

Referring now to FIG. 4, a more detailed illustration of one embodiment of the process of the present invention is provided. As shown, the process begins when a customer registers with a service provider and obtains a password, username and access code (Block 402). The service provider may be a centralized service provider providing goods and services from multiple vendors, such as ShopperBox Networks® as provided via their web page at www.ShopperBox.com, or it may be an e-commerce provider, a local vendor, an affiliate, or any other entity providing the systems and methodologies specified herein. In this embodiment, a customer uses the same access code to access a locker, and thereby is not required to recall ever changing access codes. Actual access to the lockers is controlled by the server for the service provider and/or the kiosk.

Once the customer has registered with the service provider, the process continues with the customer placing an order with the service provider (Block 404). As for the process shown in FIG. 3, this embodiment allows a customer to submit an order in numerous ways, including via the Internet, via the kiosk, telephonically, via a wireless PDA, or via any other system or device. In certain instances, where a customer's request is not supported by the service provider's automated systems, customer support personnel may be suitably connected to the customer to assist in processing the request. Additionally, when an order is placed, the customer specifies whether the order is for delivery or pick-up (Block 406).

When the order is for pick-up, the process continues with the service provider determining which locker(s) is available for the customer's needs. As mentioned previously, the system supports dynamic locker allocations such that locker allocations may occur at the time of order placement, at the time of delivery or at any other time. Further, such determinations may be made dynamically (i.e., as a customer is present at a kiosk or locker) or reserved in advance.

The service provider then directs the controller or kiosk to open/unlock the designated locker upon receiving the customer's access code (or in the case of the customer desiring service at the kiosk itself, the locker is then unlocked). Additionally, when multiple pick-up options are provided, the service provider allows a customer to specify a priority for the pick-up (for example, a dress that has to be worn that evening might receive a highest priority—and depending upon various factors, such as the amount of lead time to process the request, a higher service charge might accrue). At this time, as necessary, the service provider may establish a communications link with the vendor providing the desired goods/services and/or a carrier to determine whether the customer's order can be supported. Depending upon the systems used by the customer, appropriate messages are then provided by the service provider either automatically or by customer support personnel to the customer detailing the status and expected pick-up, completion, and other information for the order.

When the order is for delivery, the process proceeds to determining which service provider to utilize to process the order (Block 410). Additionally, the service provider determines whether aggregation of delivery or pick-up orders is possible. Aggregation basically provides for maximizing a vendor's or deliverer's efforts such that the maximum efficiencies possible are obtained. For example, instead of making repeated deliveries throughout a given time period to a particular neighborhood, the present invention enables a vendor to accumulate deliveries for the neighborhood and then make one or a minimum number of trips within a given time period.

The present invention also assists a vendor in accumulating orders for a neighborhood by offering specials, promotions and other marketing offers to potential customers in a neighborhood or area already scheduled to receive a delivery from the vendor. For example, for a pizza vendor, such aggregation might include offering specials over the Internet or via the telephone to the neighbors of a requesting customer in order to increase the number of deliveries to a certain area at one time. Specials could be made in the form of a banner on a customer's, a community's, or multiple community web pages for a special deal on a specific day. This special might be offered and visible to community members or individual customers a few days or hours prior to the desired delivery date, as desired. By so providing such notifications and specials, the vendor is provided with the opportunity to maximize sales while offering a one-time (or limited number of trips) delivery. For example, a grocer or restaurant needing to divest of excess or soon to expire food products may offer specials to regular customers, community groups, all customers, charitable organizations, or others. By utilizing the systems and methods described herein, the vendor may aggregate purchases and delivery of goods and/or services. Similarly, for a deliverer such aggregation efforts might include maximizing a driver's route such that a specific storage unit is visited only once in a day.

When determining how to aggregate the services being provided, the service provider suitably determines how many additional boxes/lockers are available (Block 412) before offering specials to additional customers (Block 414). Preferably, sufficient lag time is also accounted for in such determination so that the tardiness of a pick-up does not impact a delivery. Upon aggregating the orders, the process then continues with notifying the customer, vendor, and/or carrier of the delivery/pick-up schedule (Block 416). As orders are received throughout a day or week and the delivery/pick-up schedule subsequently varies, the process appropriately provides for notifying the customer, vendor, and/or carrier of such changes.

Upon arriving at the storage unit, the carrier appropriately provides the designated tracking code, access code, or other required verifications (Block 418). The storage unit then communicates such code to the service provider server or customer service personnel (for example, a verbal verification) (Block 420), whereupon a comparison is conducted with the authorized code (Block 422). If the comparison fails, the carrier is suitably requested to reenter the code/verification (Block 423). Depending upon the local, environmental conditions, and other factors, repeated failures to provide the correct code/verification may result in video images being captured, alarms being sounded, or the system terminating the session (Block 442). In an alternative embodiment, instead of the verifications being conducted at the server, these verifications are conducted at the kiosk. However, the invention is not limited to any specific embodiment or methodology for verifying access requests.

When the code/verification input by the carrier is correct, the process continues with the locker being unlocked, and the carrier delivering or picking-up the desired goods and closing the locker (Block 424). Upon closure of the locker, the compartment is appropriately locked and further access is not allowed to the carrier or other persons. However, in certain embodiments, in which repeated access to the locker is required, for example, when delivering numerous goods to a locker requiring multiple trips from a delivery vehicle, the present invention may be configured to secure a locker and allow repeated access to the locker by a user over a specified or determinable time period or, for example, until a carrier enters a code designating completion of the delivery/pick-up trip.

Upon delivering/picking-up the goods and securing the locker, the system then notifies the server (Block 426) and the customer of the goods delivery/pick-up (Block 428). The notification may come via any communications system desired and supported by the specific system implementing the present invention, including, but not limited to, fax, e-mail, phone message, and paging.

When a pick-up is requested, the process continues with the estimation and notification of a return date, required pick-up time, or other time constraint, if any (Block 428). For example, a system might be configured to notify a customer that the heated locker will only remain at 200 degrees for 45 minutes, after which time the heating of the locker may terminate and the food contained therein may cool down and/or spoil. Similarly, the service provider might notify the customer that their dry cleaning will be returned the next day between 5 and 6 p.m.

When the customer desires to receive his delivered goods, the customer suitably enters the access code or other verification (Block 430). The system then verifies the accuracy of such access code/verification (Block 432). If the access code/verification is incorrect appropriate measures are taken (as provided for in the case of the deliverer's failed verification) (Block 434). When the access code/verification is correct, the locker is unlocked and the customer is then allowed to retrieve the goods (Block 436). Upon removing all goods and/or securing the locker, the service provider is notified that the customer has received the goods and the locker is available (Block 438). The service provider, as dictated by specific needs, may then notify the vendor and others of the completed transaction (Block 440), at which point the process restarts.

The before mentioned systems and processes are further explained with reference to the following examples of specific utilizations of the present invention.

Major E-Commerce Partner Example

A ShopperBox Networks® customer places an order at 10 am with Grocery123.com. After finalizing his list and placing his order, he chooses delivery by 6 p.m. that evening. The order is generated and is routed to Grocery123.com for fulfillment and to IdealRental.com for tracking. The order is then assigned a unique order number which is used for tracking. Upon determination of the order size, locker requirements, and an estimated time of delivery, this information is then communicated to ShopperBox's servers, which reserve in a database the lockers needed for the order.

Also, as needed, refrigeration may be set for these lockers to start at a specific time prior to delivery. Based upon the order, Grocery123.com or the service provider determine that the order needs three medium sized lockers for delivery at approximately 4:30 p.m. The ShopperBox servers (IR servers) then determine the resident PIN # (if using touch-pad entry). Based upon delivery around 4:30 p.m., the IR servers reserve lockers 12, 21, and 23 and set the climate control to start cooling at 4:00 p.m. Also, a unique delivery PIN # is randomly generated for this order and is provided to Grocery123.com via the IR server interlink with the major E-Commerce partner. The IR servers connect to the IP address of the appropriate box and give the above information to the kiosk or controller. The kiosk receives the PIN #, sets the entry number for access to lockers 12, 21, and 23, and directs the lockers to begin cooling at 4:00 p.m. Lockers 12, 21, and 23 are now programmed to be opened upon the kiosk receiving the unique delivery PIN #.

At 4:23 p.m., the delivery of the order by Grocery123.com occurs. The delivery service enters the unique delivery PIN # at the kiosk and lockers 12, 21, and 23 are unlocked. The deliverer then places the ordered items into the three already cooled locker units and shuts the doors. At this point, the kiosk sends notification to the IR servers that the delivery has been made. The IR servers then notify the customer (via whatever method he chooses per his account information) that the delivery has been made. Also, the IR servers now tell the kiosk, via the Internet, to set the access PIN # for the three lockers to the customer's PIN #.

The customer arrives at his residential complex at 6:15 p.m. and enters his PIN #. Upon verifying the PIN #, the appropriate three lockers open and allow the customer to retrieve the order. The IR servers are now notified that the customer has retrieved the order. After a specific period of time has expired (preferably, 5–10 minutes), the IR servers reprogram the available lockers with a generic PIN # (or, possibly, just locks the lockers) such that they are now secured and are available for a subsequent request. Also, the climate control units are turned off on these units, since they are now not needed.

Local Sponsor Example

While online perusing their ShopperBox Networks community page, a customer discovers that the Best Mediterranean Cuisine restaurant (BMCr) has an account with ShopperBox Networks who has lockers located near his residence, and that the restaurant has posted an advertisement for a special that evening on baklava. The customer loves baklava and places a telephone order at 9:00 a.m. with a BMCr representative. While posting the order, the customer specifies delivery before 6:00 p.m. BMCr receives the order from ShopperBox Networks, determines availability, and indicates that they can fulfill the order. BMCr, utilizing their own delivery service or ShopperBox Networks delivery service, delivers to the customers location at 4:00 p.m. The delivery person approaches the kiosk, chooses "delivery on account", and inputs the unique PIN # assigned to each local sponsor. The kiosk contacts the ShopperBox Networks servers and verifies the account. Once verified, the delivery person is queried by the kiosk as to the size and number of lockers needed for the delivery as well as whether they need to be climate controlled. The delivery person chooses a single medium box, heated. The kiosk queries whether there are any available climate controlled medium lockers. If so, a request is made by the kiosk to the server to reserve the particular type of locker. The servers respond with an affirmative. The delivery person then enters the name of the resident he is delivering to, or selects the customer's name from a searchable listing of community residents. At this time several things happen:

1. The locker is opened and the heating unit is turned on;
2. The delivery person places the order in the designated locker and shuts the door;
3. The kiosk notifies the server that a delivery has been made;
4. The server reprograms the specified locker with the customer PIN #;
5. The server notifies the customer that a delivery has been made; and
6. The server charges the account of BMCr for use of the locker.

The customer arrives at 5:40 p.m. and enters his PIN # at the kiosk. The kiosk releases the lock on the specified locker and the customer then retrieves his order. The kiosk then turns off the heating unit and notifies the server that the customer has retrieved his order. The server then reprograms the locker with a generic code (or lock it out completely) and updates the locker status as being available.

Referring now to FIGS. 5 and 6, one embodiment of a series of user interfaces utilized by the present invention to facilitate interaction between a carrier delivering goods to and a customer receiving the goods from a locker controlled by a server of the present invention is provided. As shown, this embodiment utilizes a touch screen display, situated at a kiosk, to facilitate such interactions. However, it is to be appreciated that other user interface devices and/or combinations of devices may be utilized. Further, the interface may occur via a users computer workstation, PDA, DIAD board, or other devices known in the art, as discussed previously herein.

Figure 5A:
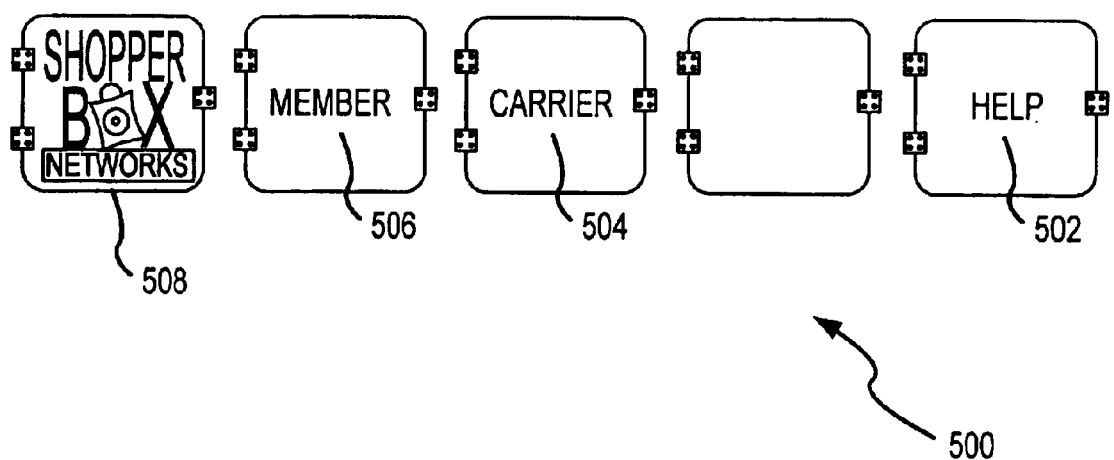

As shown in FIG. 5A, the server begins each session by requesting a user to select an appropriate button/box shown on the session initiation screen 500. A Help box 502 is provided on various locations on the numerous screen displays provided in this embodiment. The Help function provides on-line help features, the use and accessing of which are well known in the art, and is also configured to provide live help with a customer service representative when such functionality is available. Also provided on this screen 500 are buttons for designating whether the user is a carrier, via button 504, a member/customer, via button 506, or desires to access the Internet based ShopperBox Networks.com web site, via button 508. Each of these buttons and their associated functionality are described in greater detail herein below.

Figure 5B:
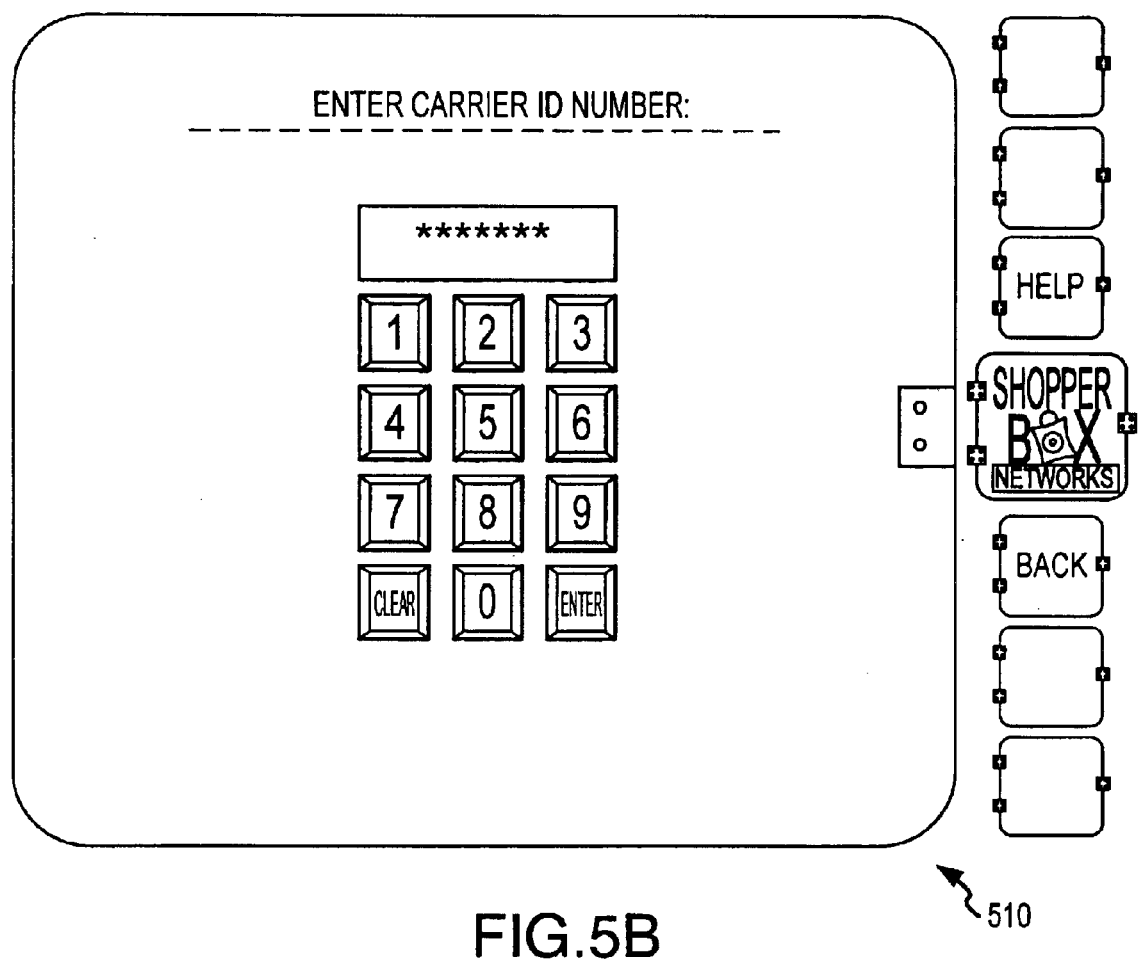

When the carrier selects the Carrier button 504, the server returns the carrier log in screen 510, as shown in FIG. 5B. This screen 510 provides the carrier with a touch sensitive key pad display upon which the carrier may enter their unique ID number.

Figure 5C:
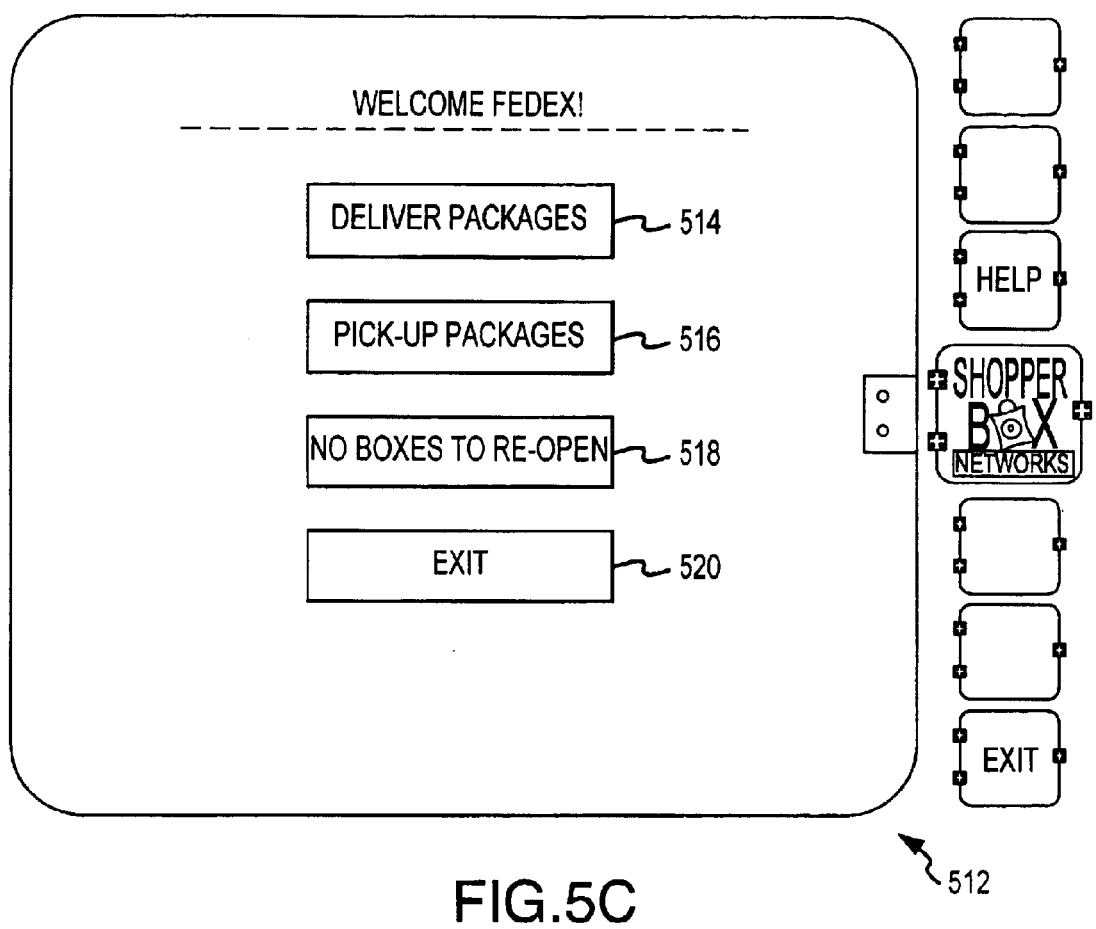

Upon entry of the appropriate user ID number, via the touch screen or otherwise, the server presents to the carrier the Carrier Welcome screen 512, as shown in FIG. 5C. This screen 512 enables the carrier to deliver packages (via button 514), pick-up packages (via button 516), designate that their operations are completed (via button 518) and/or exit the system (via button 520). The server enables the various buttons on this screen based upon various factors. For example, the deliver packages button 514 may be disabled if dynamic package allocation is not enabled or available and the carrier had not previously designated to the server that a delivery was to be made. Similarly, this button 514 may be disabled if all the lockers connected to a given kiosk are full. Further, the Pick-Up Packages button 516 is enabled when goods exist in lockers for pick-up by the given carrier (for example, UPS). At all other times, this button 516 is preferably disabled. It is to be appreciated that buttons may be disabled by the server and/or not displayed based upon the user and the given situation (i.e., a delivery or a pick-up).

Figure 5D:
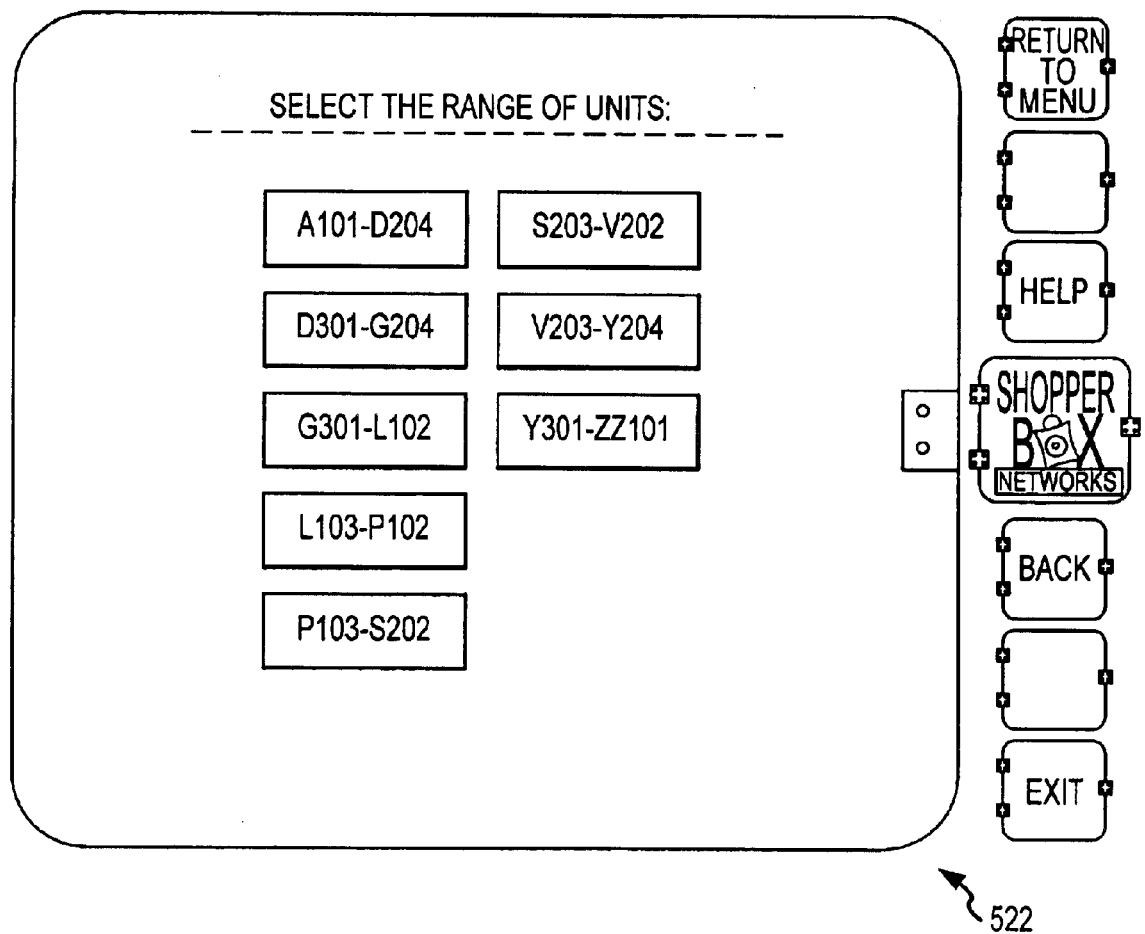
Figure 5E:
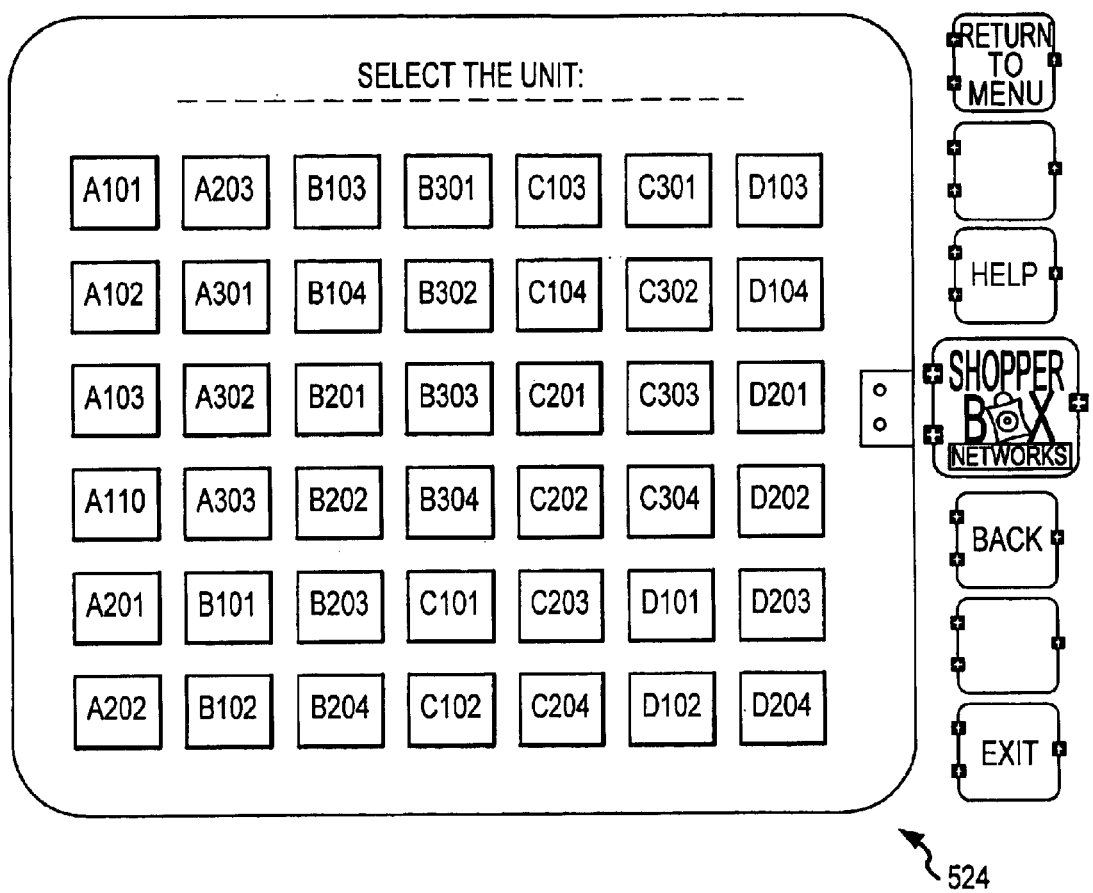
Figure 5F:
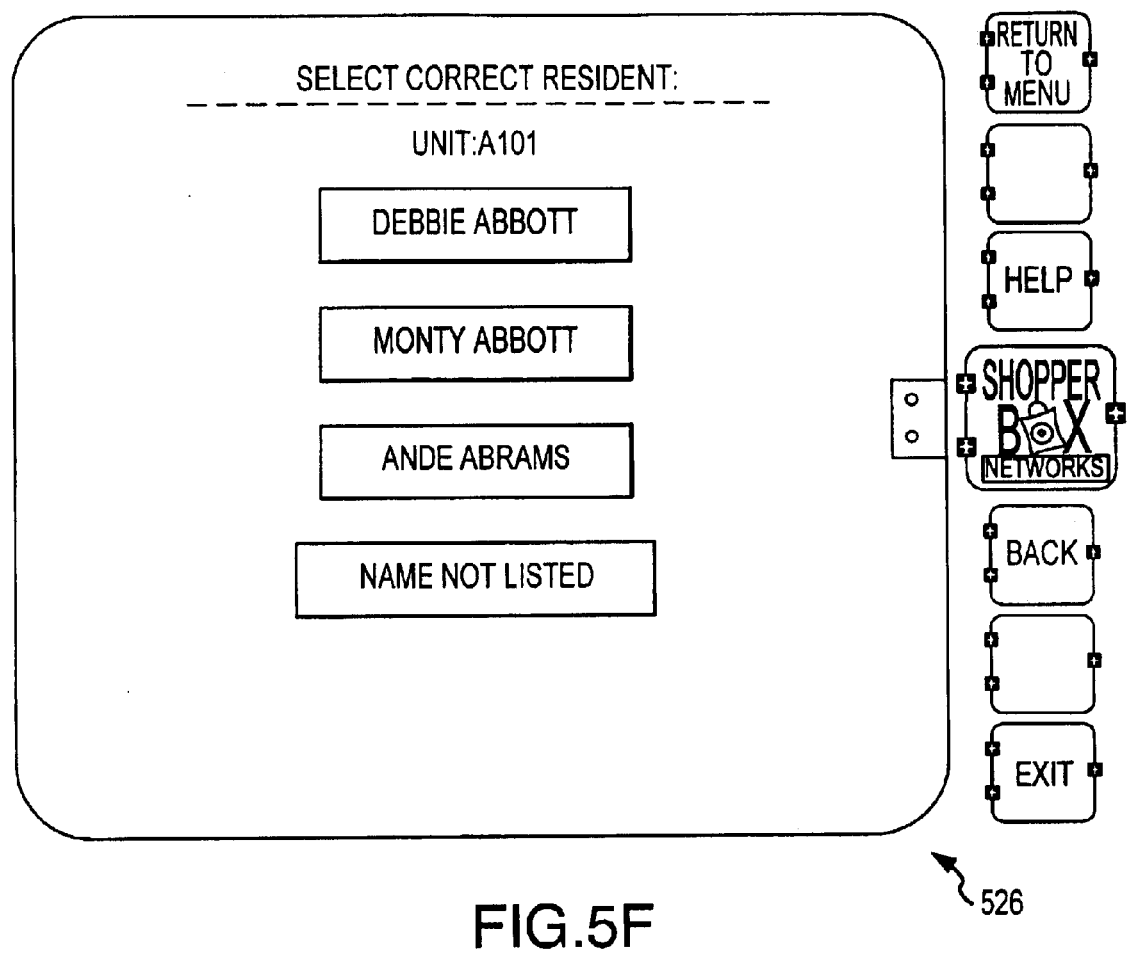

When the Deliver Packages button 514 is selected, the server presents a screen display 522, as shown in FIG. 5D, showing the range of units (for example, in an apartment complex) for which a delivery may be designated. As shown, such units are presented in groupings which thereby enable a user to quickly identify a given unit. It is to be appreciated that other groupings may be provided as desired and that the server based system of the present invention facilitates the efficient addition/deletion/modification of such displays from a single server. FIGS. 5E–5F show a further breakdown of units alphabetically by building, numerically by apartment unit, and by name by resident of such apartment unit (which is desirable in that it prevents delivery of goods to unauthorized persons (even if they are located in the same apartment) by assigning each dweller their own account with the system. It is to be appreciated that the server side implementation of the present invention enables system administrators to update numerous kiosks in a given apartment complex with one update, instead of performing numerous updates for numerous kiosks. Further, this approach enables the system to ensure that only authorized users are given access to lockers.

Figure 5G:
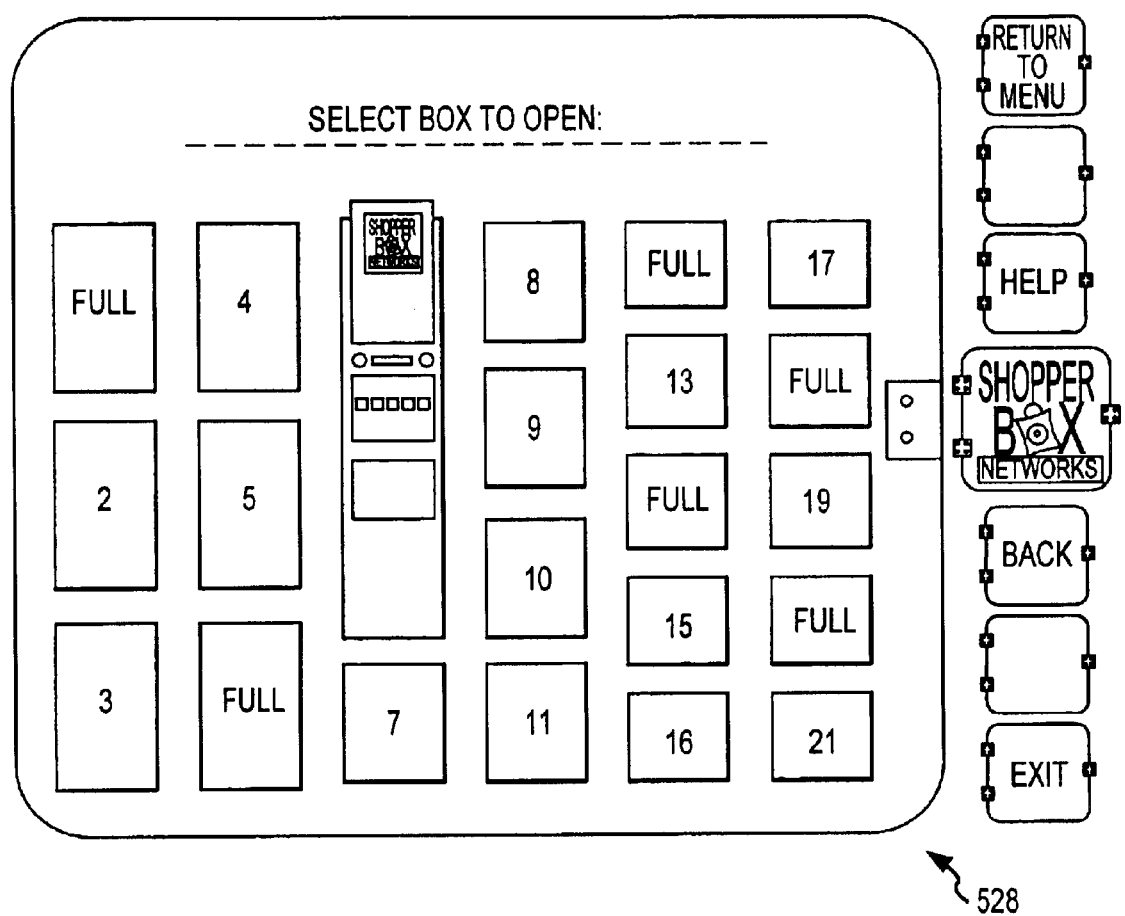

Once the intended recipient for the goods has been identified by the carrier to the server, via the kiosk or other device, the server proceeds with presenting an indication of available lockers, if any, to the carrier as shown in FIG. 5G. The carrier may then select any available locker or a locker of a specific size or possessing specific features and/or characteristics (for example, a refrigerated locker). The carrier may also select a "full" locker and receive status information indicating when the locker is scheduled to be available. Such a feature may be utilized when specific goods should be stored specific lockers. As such, the Locker selection screen 528 facilitates dynamic locker allocation while also enabling users to reserve lockers. It is to be appreciated that the server may assess charges to users who utilize a locker for longer than allocated (for example, a tenant who fails to pick up their delivery for a week may be charged late pick-up fees). Such late fees encourage the efficient utilization of lockers by customers and carriers. Further, a carrier, as desired, may reserve a given set of lockers only for deliveries by their company. For example, UPS may desire to reserve lockers 8–21 for UPS deliveries only. The server side control enables such dynamic and pre-determined utilizations of lockers to be efficiently modified as desired and/or needed.

Figure 5H:
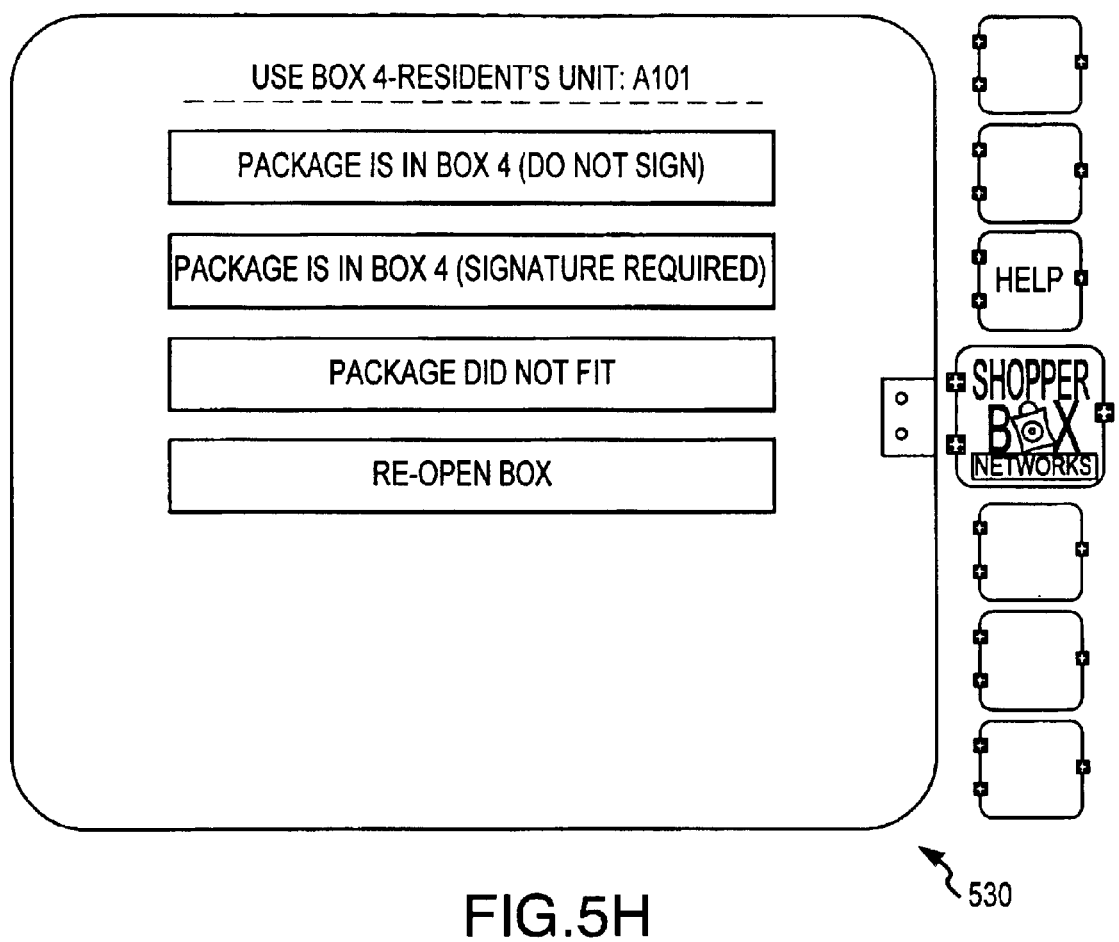

Additionally, after a locker has been selected (or if reserved, identified), the carrier may then designate how the customer is to acknowledge receipt of the goods, as shown on screen 530 in FIG. 5H. As shown, the carrier may require the customer to sign for the goods. It is to be appreciated that a signature may include an electronic authorization, such as the entry of a username and password, and is not to be construed as being limited to a physical signature, for example, on a signature pad via a stylus. Further, this screen 530 enables the carrier to also designate whether the package did not fit, whether they need to reopen the box/locker (for example, to deliver additional goods thereto) or any other use specific variables, for example, whether to activate a cooling/heating system (not shown).

Figure 5I:
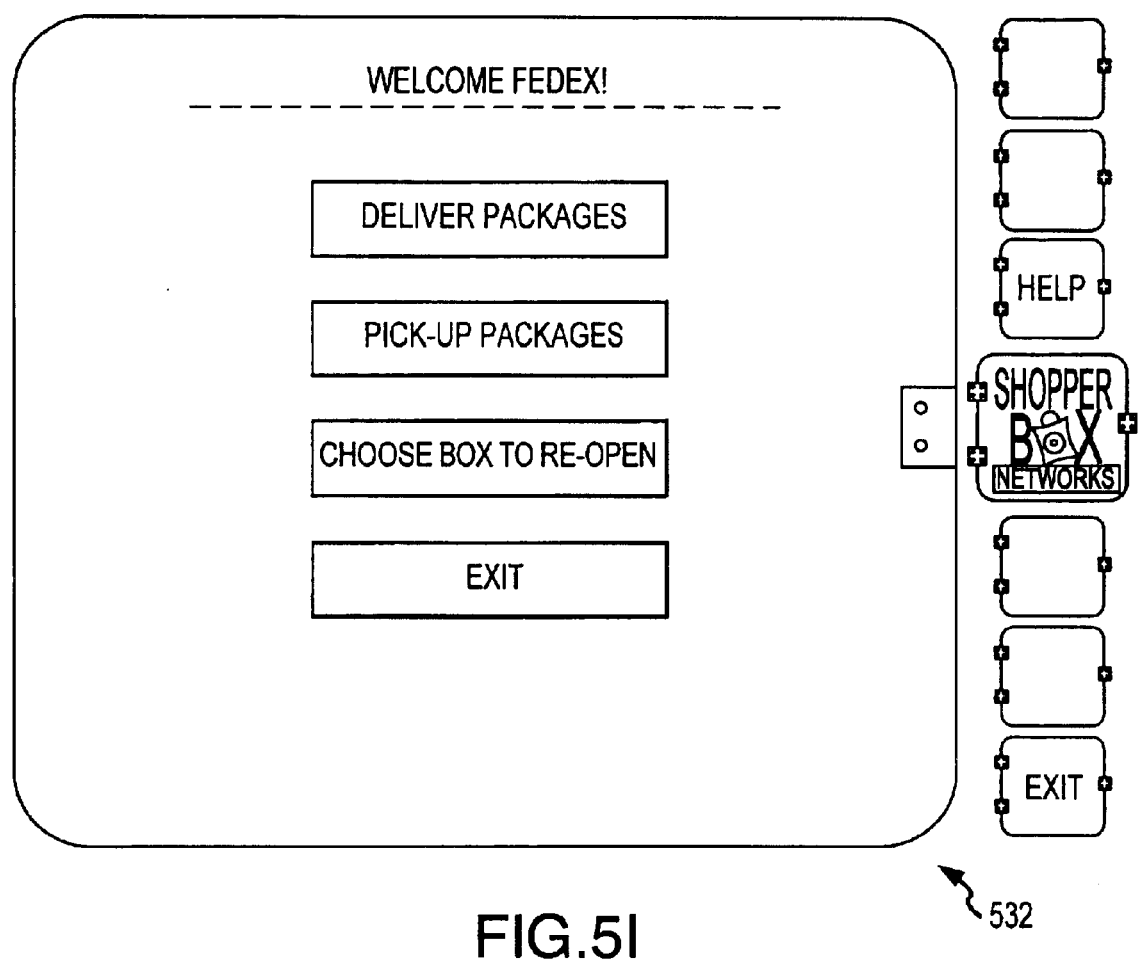
Figure 5J:
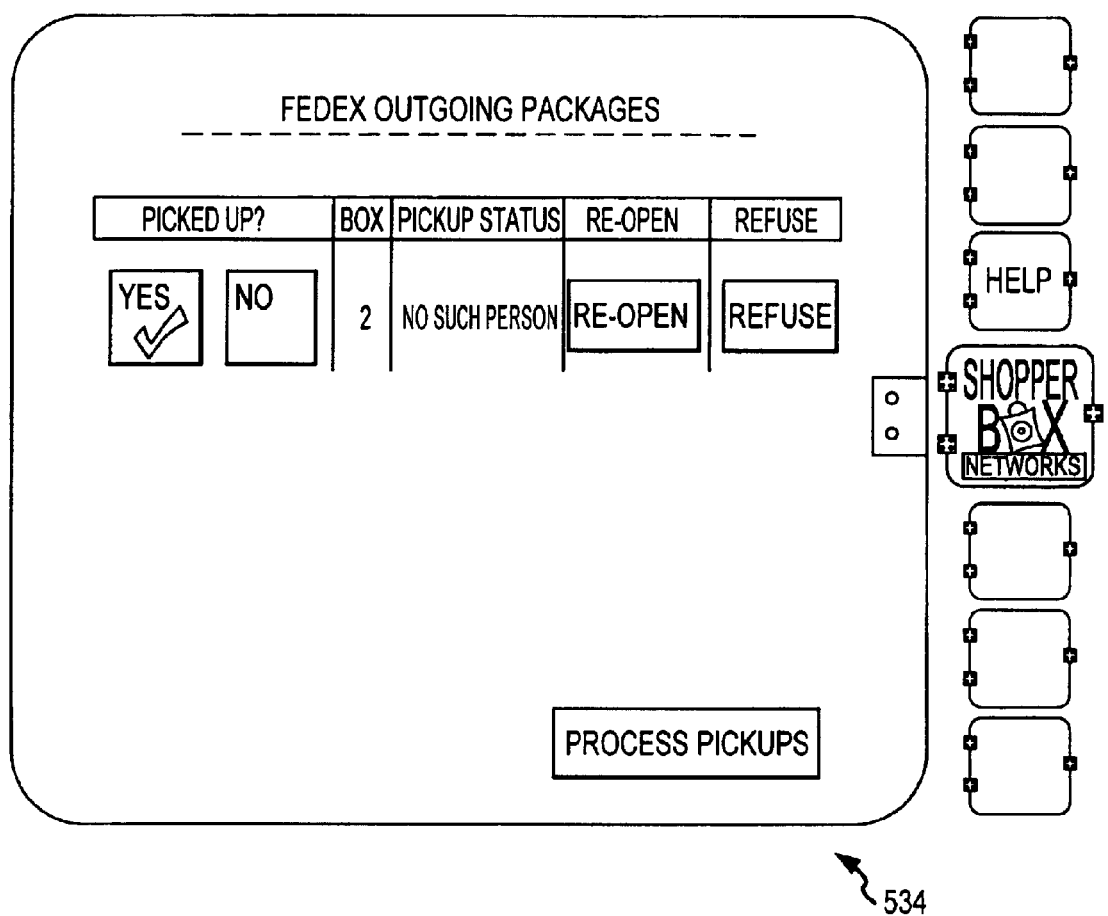

Once the goods have been inserted into the designated locker, the server then queries the carrier as to whether additional goods are to be delivered, as shown on screen 532 in FIG. 5I. At this point, the process repeats itself, as necessary, when goods are to be delivered to a locker associated with the kiosk at which the screen 532 is being presented. Further, it is to be appreciated that the system may be configured such that the carrier only visits the kiosk once and identifies to the server, for example, via a wireless link with their DIAD board, their locker needs for a given visit. In such an embodiment, all the lockers necessary for the carrier (assuming all such lockers are available) are assigned and unlocked at once instance, thereby eliminating the necessity of the carrier repeating the before mentioned process steps to gain access to a locker. The carrier's DIAD board may be appropriately configured to interact with the server (via the kiosk and/or directly), for example, identifying locker sizes needed, intended recipients of such goods, billing information and other parameters.

Referring again to FIGS. 5C and 5I, when the Pick-Up Packages button 516 is selected similar functionality is provided. In one embodiment shown in FIG. 5J the carrier may accept or refuse a good for delivery, may re-open a locker and, when goods are picked up, may direct the server to process the pickups (i.e., determine shipping addresses, billing information and other variables). Such delivery information may be utilized by the carrier to more efficiently route their deliveries and is preferably compatible with any order tracking system utilized by the carrier.

Further, once all of the lockers containing goods to be picked-up by the carrier are identified, the lockers are preferably unlocked in sequential order or in an otherwise pre-determined order. This feature enables the carrier to merely identify themselves once to the server and then sequentially remove goods from lockers without concern as to the safety of goods they have not retrieved yet from other lockers (which may be a concern in a large complex of lockers or in a high crime neighborhood). Once all the goods identified to the carrier are delivered or picked-up, the process terminates and the session initiation screen 500, as shown in FIG. 5A, is presented by the server. At this point other carriers may make deliveries/pick-ups to the lockers as needed. Further, the server sends a notification, via a communication link (i.e., a phone call, e-mail message, Short Message Service (SMS), page, or otherwise), to each customer and/or vendor for whom a pick-up and/or a delivery was accomplished. In this manner, customers are notified when a good is delivered and vendors are notified when such delivery/pick-up has been accomplished. It is to be appreciated that such information may by used for order tracking purposes, for tracking the actions and/or efficiency of deliverers and for various other purposes. Further, such notifications may occur at any point along the goods delivery/pick-up cycle, but preferably occur upon completion of a pick-up/delivery session by a user.

Figure 6A:
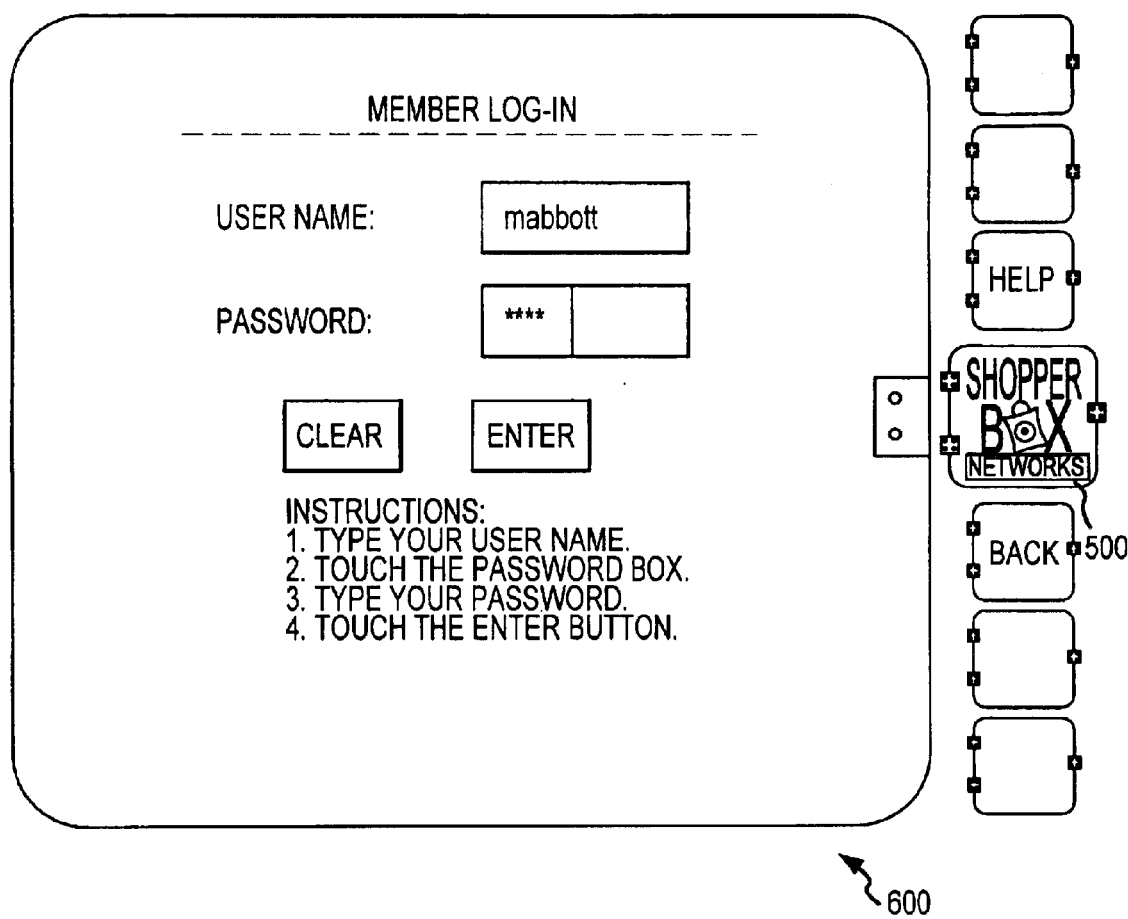
Figure 7A:
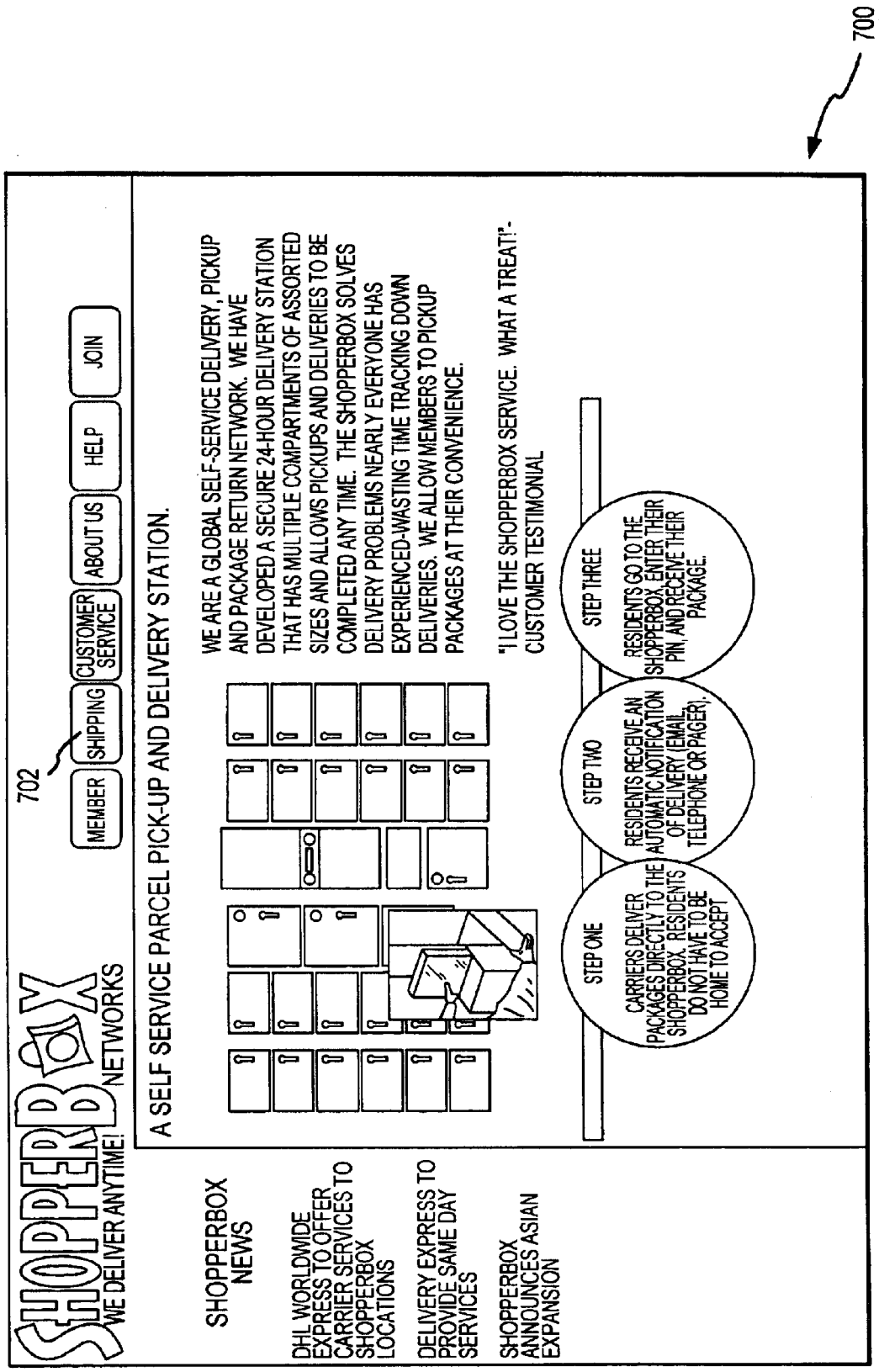

When a customer/member desires to retrieve goods from a locker controlled by the server, the member, if they have pre-registered with the system, selects member button 506, as shown in FIG. 5A. The server then presents the member log-in screen 600, as shown in FIG. 6A. If the user has not pre-registered with the system, the user may select the ShopperBox Networks button 508, which when enabled, allows the user to access the ShopperBox web site and register with the system. When an individual kiosk is not web enabled, the user may register to the system by accessing the ShoppperBox Networks web site via any web browser or comparable system as shown in FIG. 7A. The process by which a user becomes a member is discussed in greater detail herein below.

Figure 6B:
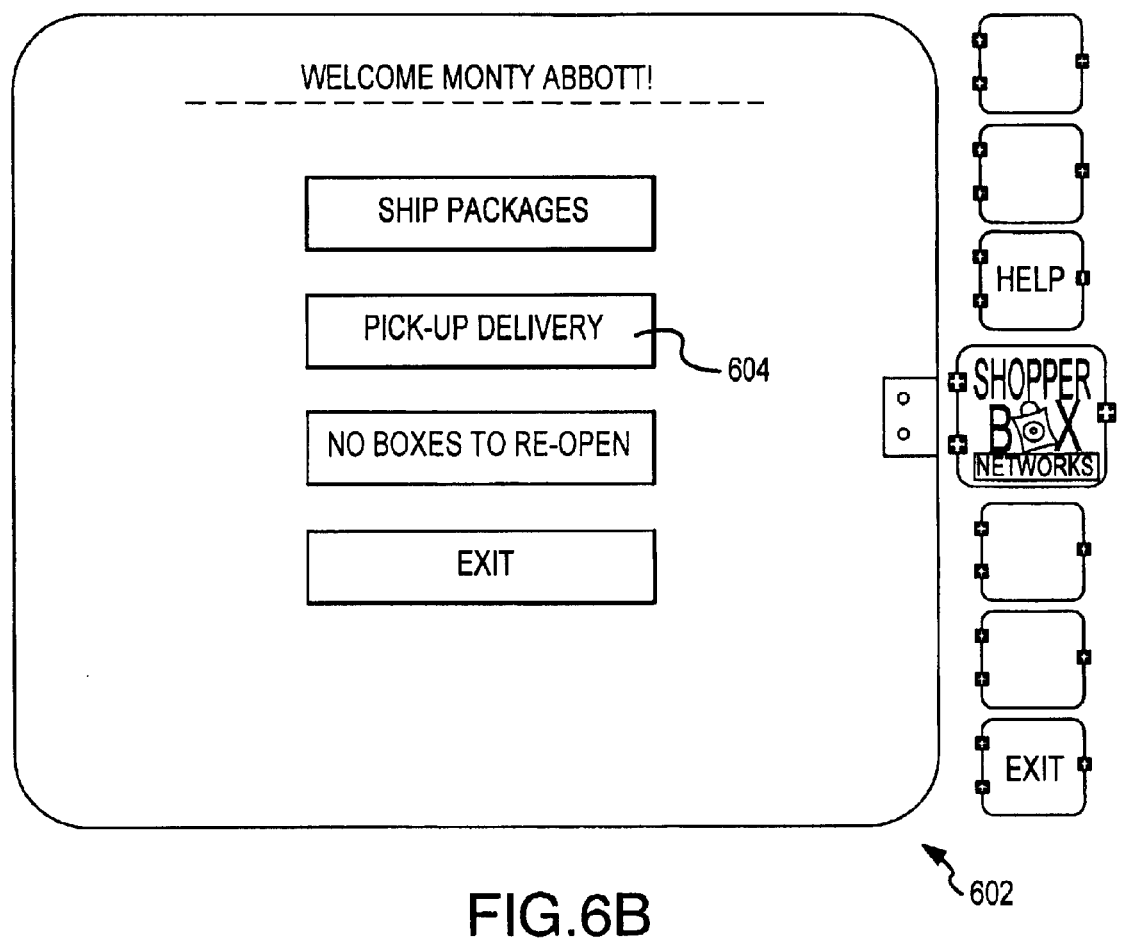

Referring again to FIG. 6A, as provided for the carrier, the member log-in screen 600 utilizes a user name and a password to identify the customer/member/user and provide access to the features and functions of the present invention. However, other log-ins may be utilized. Upon the customer/member logging in, the server presents the welcome screen 602, as shown in FIG. 6B.

This screen 602 enables the customer to ship packages, pick-up deliveries, and designate when there are no further lockers/boxes to re-open. For example, if a locker containing groceries was previously unlocked and all the contents had not yet been removed, the system enables the customer to remove part of the load and take them to their destination while the remainder are secured in the locker. The customer may then revisit the kiosk and retrieve the remainder of their delivery. For purposes of simplicity, the customer interfaces provided by the server are discussed first in the context of a customer receiving goods previously delivered to a locker by a carrier. The placement of goods in a locker for redelivery to a manufacturer or others by a user is discussed herein below with reference to FIG. 7.

Figure 6C:
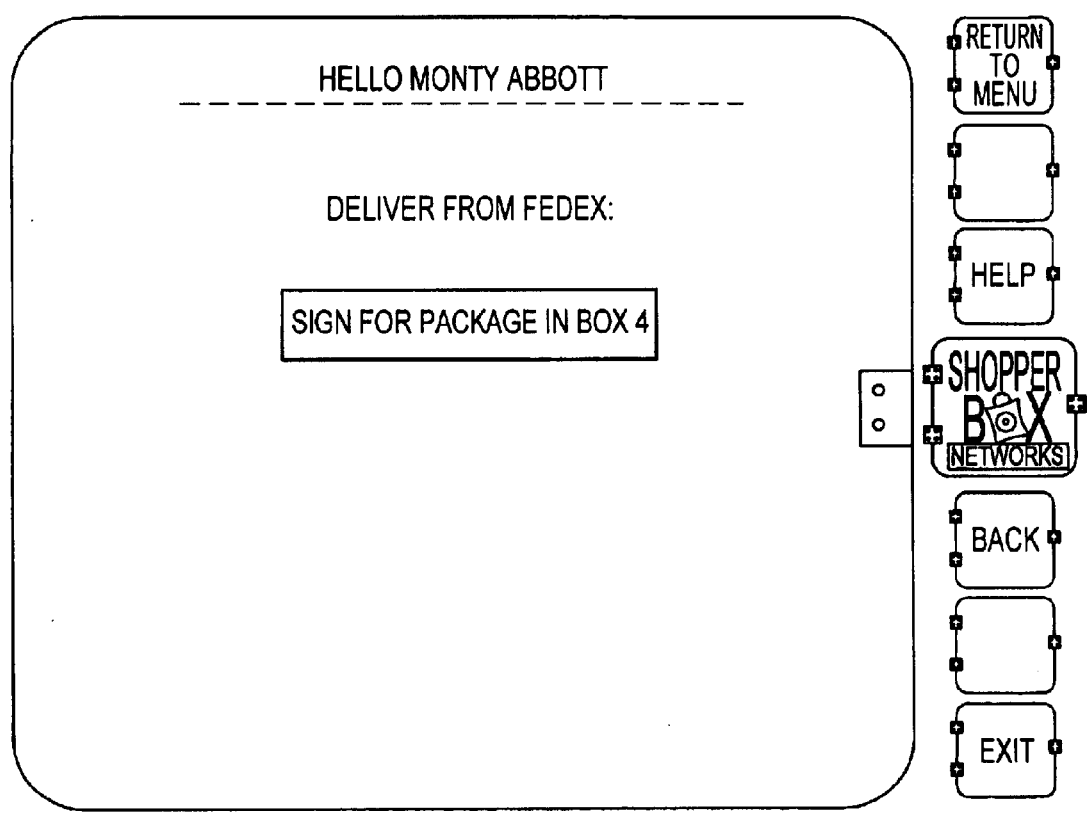
Figure 6D:
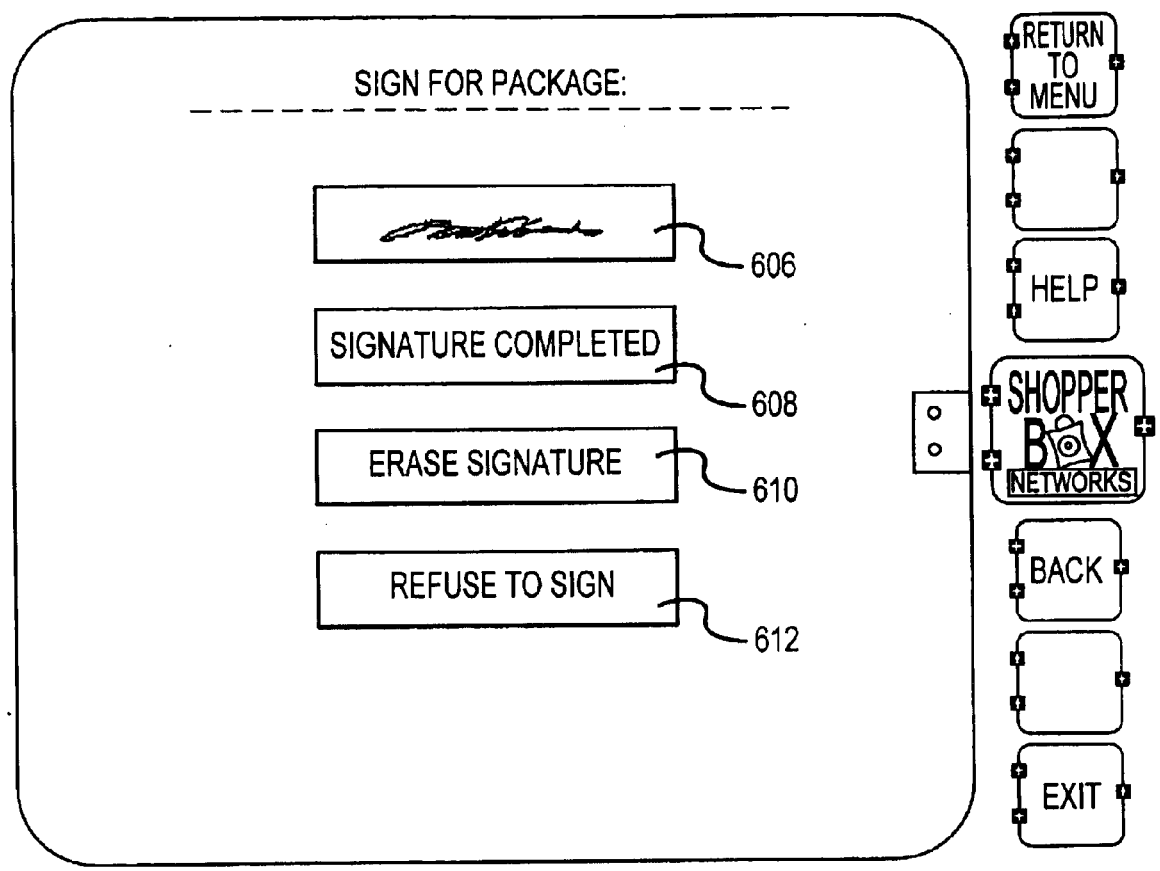

Referring again to FIG. 6B, when a customer signs-in with the server, via a kiosk or otherwise (for example, via a remote connection established with a PDA, telephone or other device), and selects the Pick-Up Delivery button 604, the server suitably identifies to the customer whether a signature is or is not required to accept the goods, as shown in FIG. 6C. Information about the carrier and/or the vendor providing the goods is also provided to the customer, in certain embodiments of the present invention. The customer may then appropriately "sign" for the goods. As shown in FIG. 6D, such signature may be accomplished on a signature pad, however, other forms of signatures may also be utilized including, but not limited to, e-signatures. In the embodiment shown in FIG. 6D, the server also presents a representation of the customer's signature 606, which the customer may indicate is complete (via button 608), erase (via button 610), or refuse to sign (via button 612—in which case no signature is presented in field 606. Based upon the requirements of the shipping arrangements specified by the vendor and/or the carrier, a refusal to provide a signature may result in the delivery to the customer being denied and access to the goods in the locker withheld until such signature is provided.

When a signature is provided and required, the server may also verify the signature with a previously recorded signature. As such, the server supports additional user authorization verifications as desired for particular shipments of goods. Assuming the authorizations are complete, the server then directs the kiosk/processor to unlock the locker(s) in which goods designated for the customer are stored. A notification may also be provided to the customer of the locker number and/or location. When lockers are distributed throughout a complex and are not co-located with a kiosk, a delay may be built-in (to allow the user to travel to the locker) or other user verification devices co-located with a particular locker may be utilized, thereby minimizing the incidence of theft of goods from unlocked lockers.

Figure 6E:
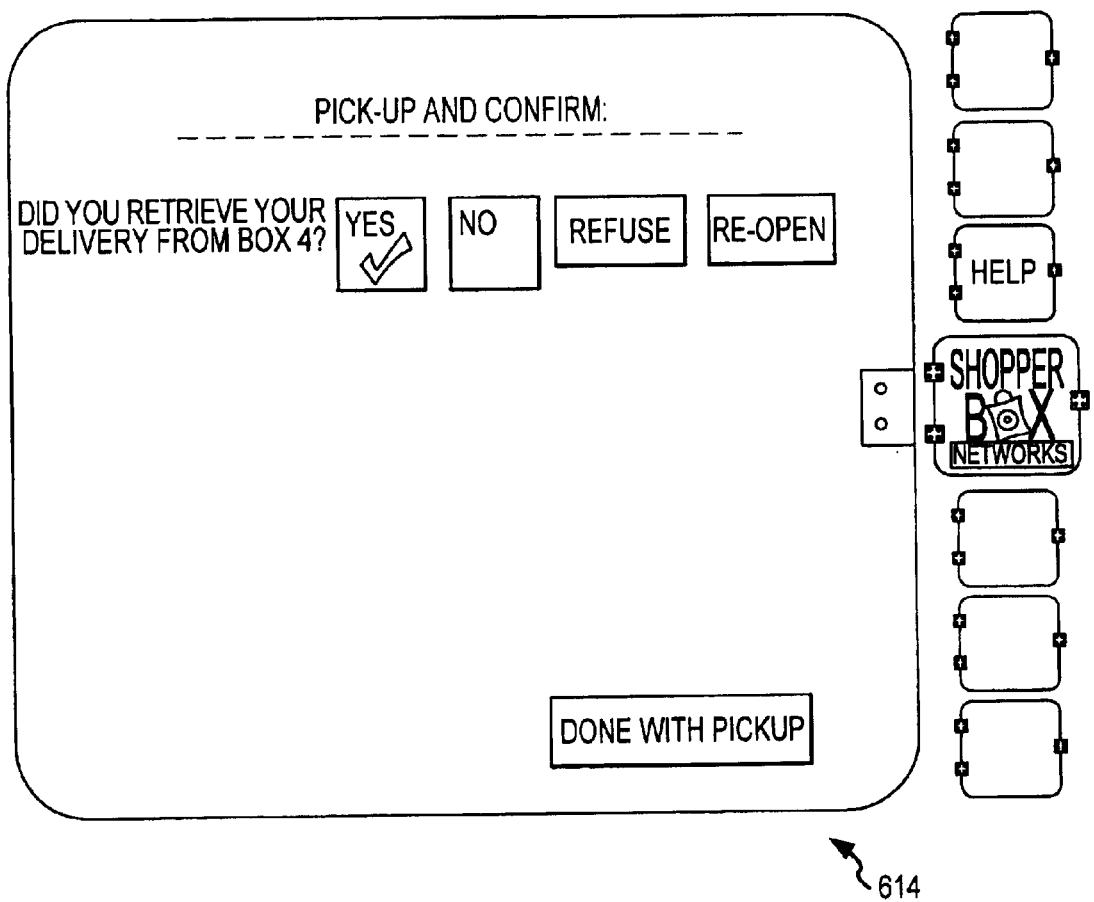

Once the customer has retrieved the goods from the designated locker, the server then queries the customer as to whether all such goods have been retrieved, as shown in FIG. 6E. This feature enables the customer to revisit the locker (for example, to retrieve multiple goods), with the locker being secured between each visit. Appropriate time delays are built into the system such that a non-response by a customer, within a pre-determined time period, secures the locker. This screen 614 also enables a customer to refuse a delivery (for example, because the pizza is cold). When a delivery is refused, the server appropriately notifies the vendor and/or carrier responsible for such delivery and coordinates a pick-up of such goods by such vendor/carrier from the locker as necessary.

Figure 6F:
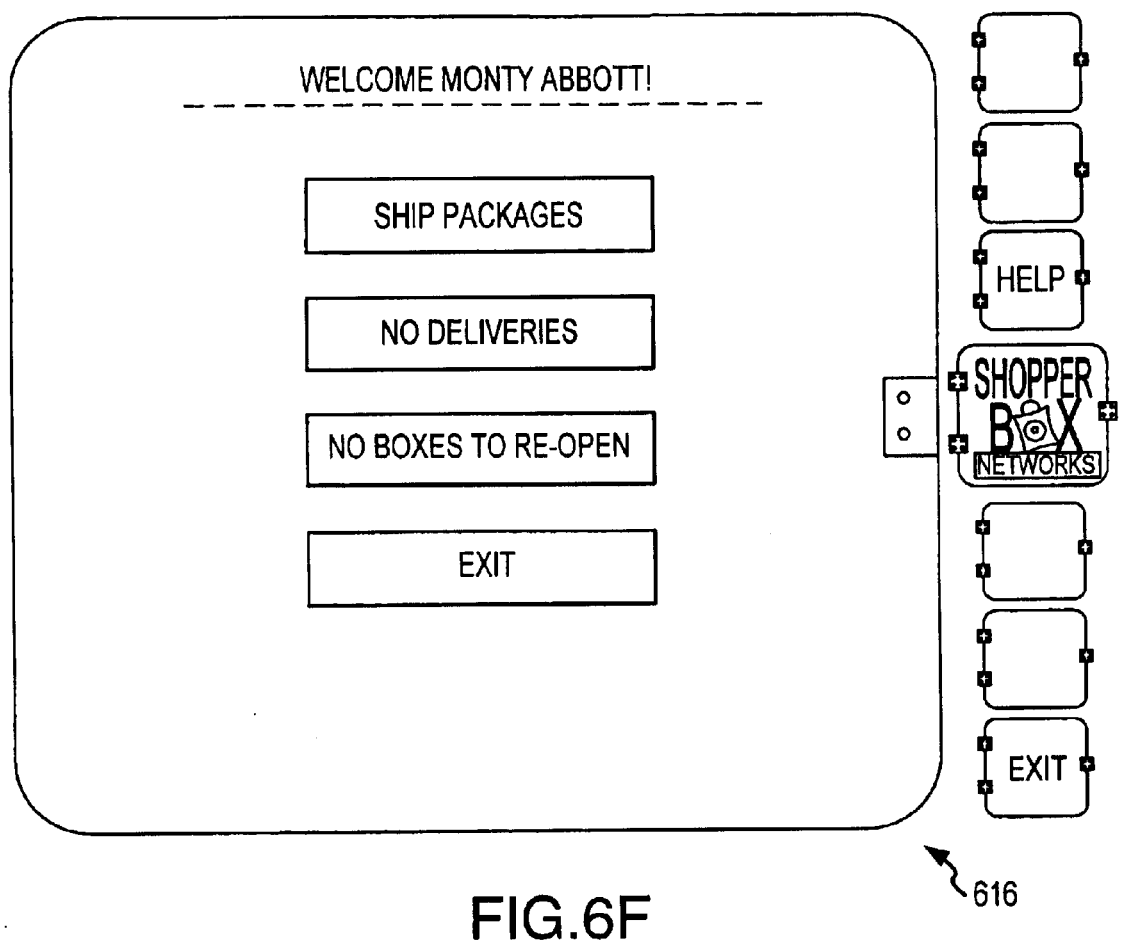

After the customer has retrieved all goods from those lockers controlled by a given kiosk or associated with a given area (when a remote access is utilized), the server presents an updated welcome screen 616, as shown in FIG. 6F. As shown, this screen enables the customer to ship packages and identifies to the customer that they have no deliveries and there are no boxes to Re-Open. It is to be appreciated that this screen 616, or a similar screen, may also be presented to a customer at the beginning of a user session. In certain embodiments, for example, where a customer does not have a pager, e-mail account, access to SMS, phone, or otherwise does not wish to be contacted when goods are delivered to a locker, the customer may desire to periodically check the status of delivered goods by entering their user name and password and being presented with either FIG. 6B or FIG. 6F, or a similar figure.

Referring now to FIG. 7A, when a user desires to become a member of the ShopperBox Network or a similar system implementing the present invention, the user suitably connects to the ShopperBox Networks web site (or in non-web enabled applications, contacts a customer support personnel, or utilizes a web enabled kiosk as mentioned above) and provides appropriate registration information. Such information includes, but is not limited to, demographic information, contact information, preferred locker location and alternate locker locations, preferred delivery times for non-perishable items, and similar information. The user is then provided, or provided at a later time, a user name and password.

Figure 7B:
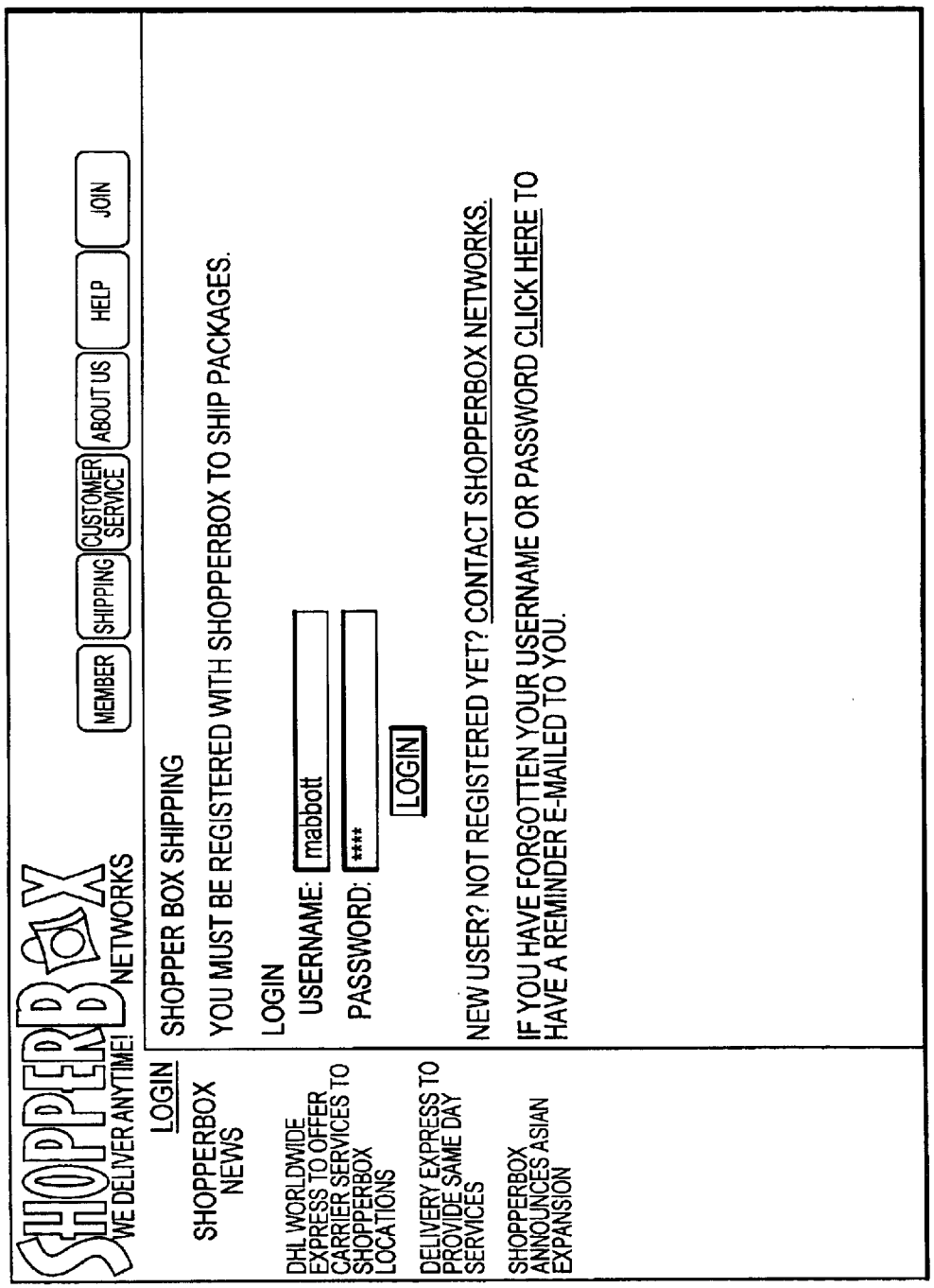

As shown in FIG. 7A, when a user desires to ship a good, via a locker, the user suitably selects, on the home page screen 700, the shipping button 702. At this point, the web server, which may or may not be the same as the server 102 utilized to support the operation of the lockers 120, returns the login screen 704, as shown in FIG. 7B.

Figure 7C:

Upon entry of a correct user name and password, the user (a customer or a vendor) is provided with at least one choice of a carrier, as shown in FIG. 7C. Information about the carrier, including the territories which they serve, may also be provided. Upon a user selecting a carrier, the server provides general shipping terms in the form of a click-wrap agreement, as shown in FIG. 7D.

Figure 7F:
Figure 7G:

Upon acceptance of the terms, the server continues to process the shipment request. When the user disagrees with the terms, the shipment request terminates and the user may either select another carrier or exit the system. When the terms are acceptable, the server then requests destination information for the goods to be shipped, as shown in FIG. 7E, and the point of origin for shipping such goods, as shown in FIG. 7F. Further shipment details are provided in FIG. 7G including, but not limited to, the estimated weight or the actual weight (for example, in certain embodiments wherein the shipment is being placed at a kiosk equipped with a scale), the dimensions of the goods to be shipped, and the declared value.

Upon entering this shipment information, the server then determines the charges which will be accrued if the goods are shipped to the destination. These charges may be determined based upon rate information periodically downloaded into the database 108 and/or based upon determinations made upon carrier specific servers/systems that are provided with the information inputted by the user.

Figure 7H:
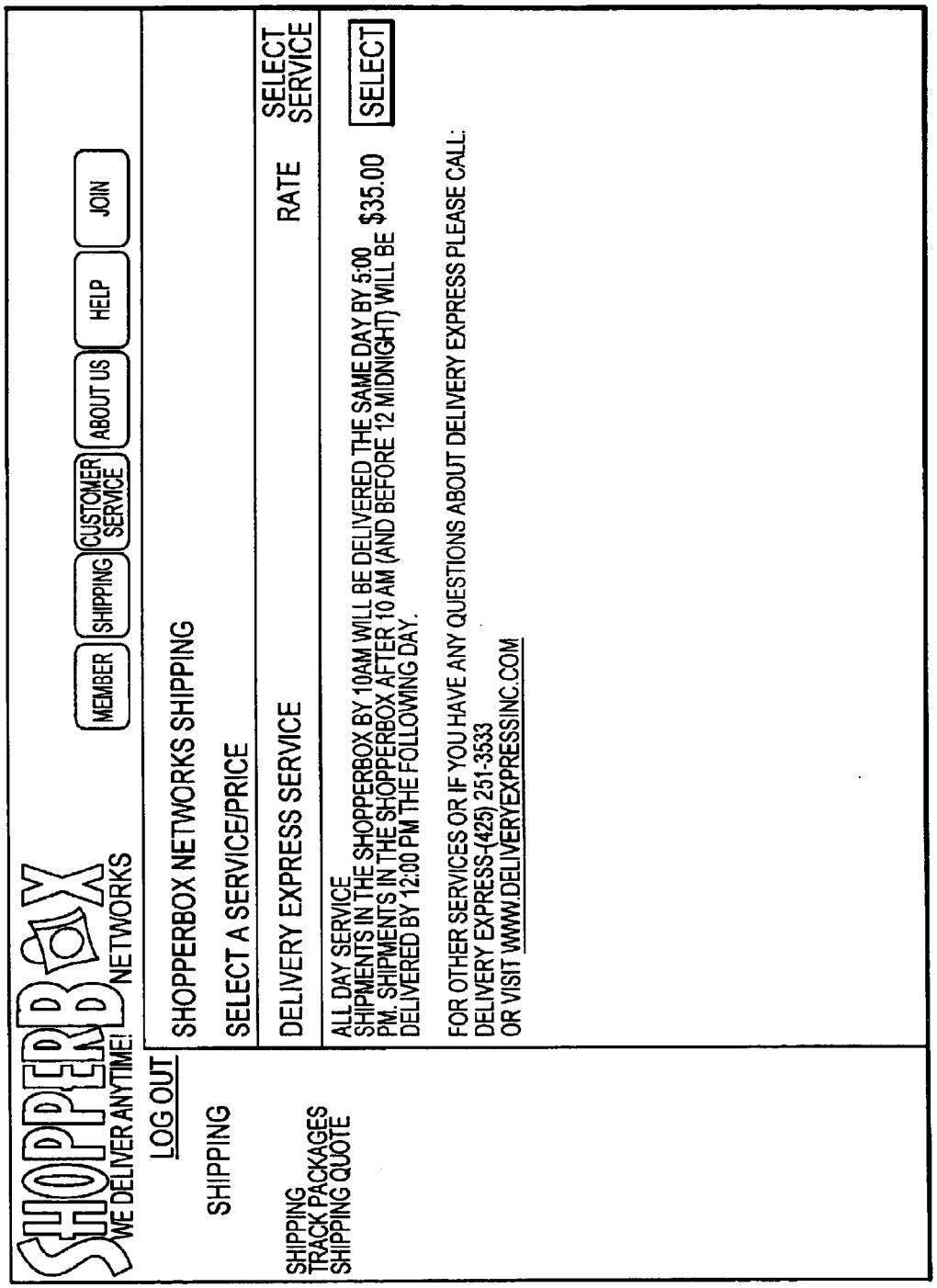
Figure 71:

Once the charges are calculated, they are presented to the user for selection, as shown in FIG. 7H. In certain embodiments, comparisons may also be provided between a selected carrier and a preferred carrier or alternative carrier. Such comparisons facilitate the order aggregation features of the present invention, as discussed above.

Figure 7J:

Once a carrier is selected, the server then requests payment information. One method of payment is credit card, as shown in FIG. 7I. It is to be appreciated, that in various other embodiments, alternative payment mechanisms may be utilized including, for example, COD, return to sender on sender's account, free (for example, for frequent ShopperBox'ers), at a discounted rate, and the like. Once payment is authorized, the user is provided with one last chance to confirm the order and either cancel it or proceed, as shown in FIG. 7J.

When the user confirms the order from an appropriately equipped system or kiosk, the user may also receive a shipping label for attachment to the goods, as shown in FIG. 7K. It is to be appreciated that such shipping label may also be provided to the user upon their arrival at a kiosk and/or otherwise (for example, via a fax). Either way, the user is provided a shipping order number and instructions on how to complete the shipping process and/or ship additional goods, as shown in FIG. 7L.

Figure 7M:
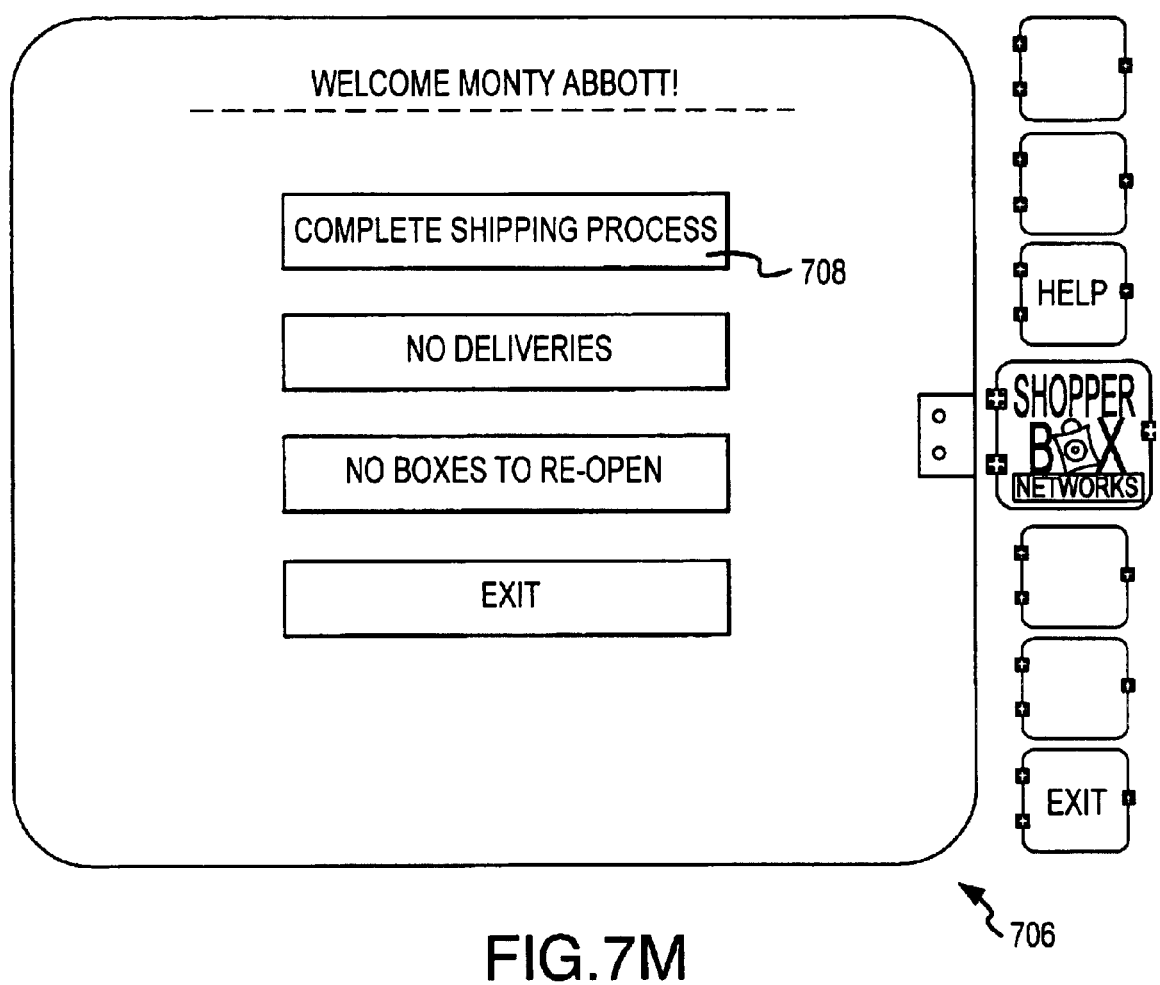
Figure 7N:
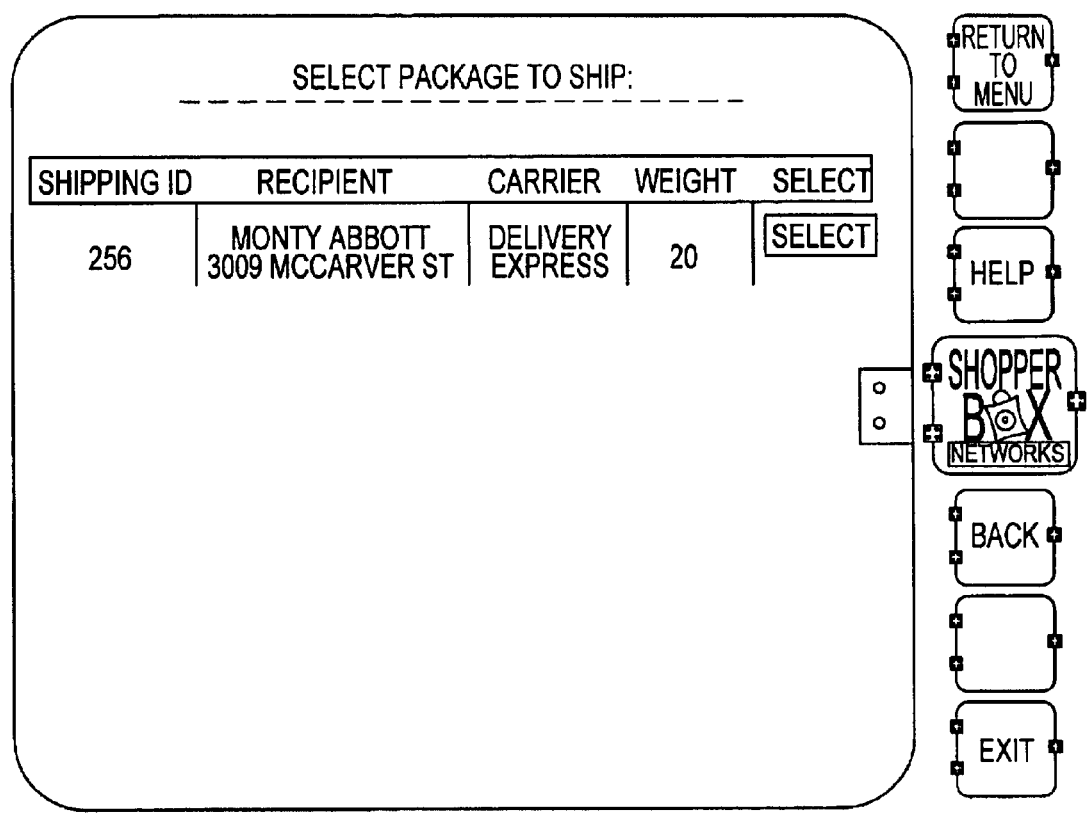

At this point, the user has identified to the server that a shipment of goods is to occur from a locker. However, the goods have not yet been placed into a locker. As shown in FIG. 7M, upon the user proceeding to a kiosk and entering a user name, password and selecting the shipping option, the server presents the Welcome screen 706, with the Complete Shipping Process button 708 highlighted, as shown in FIG. 7M. Upon selecting this button 708, the server presents to the user a listing of shipment options (if more than one shipment has been previously requested to the system), as shown in FIG. 7N (wherein only one shipment has been requested).

Figure 7P:
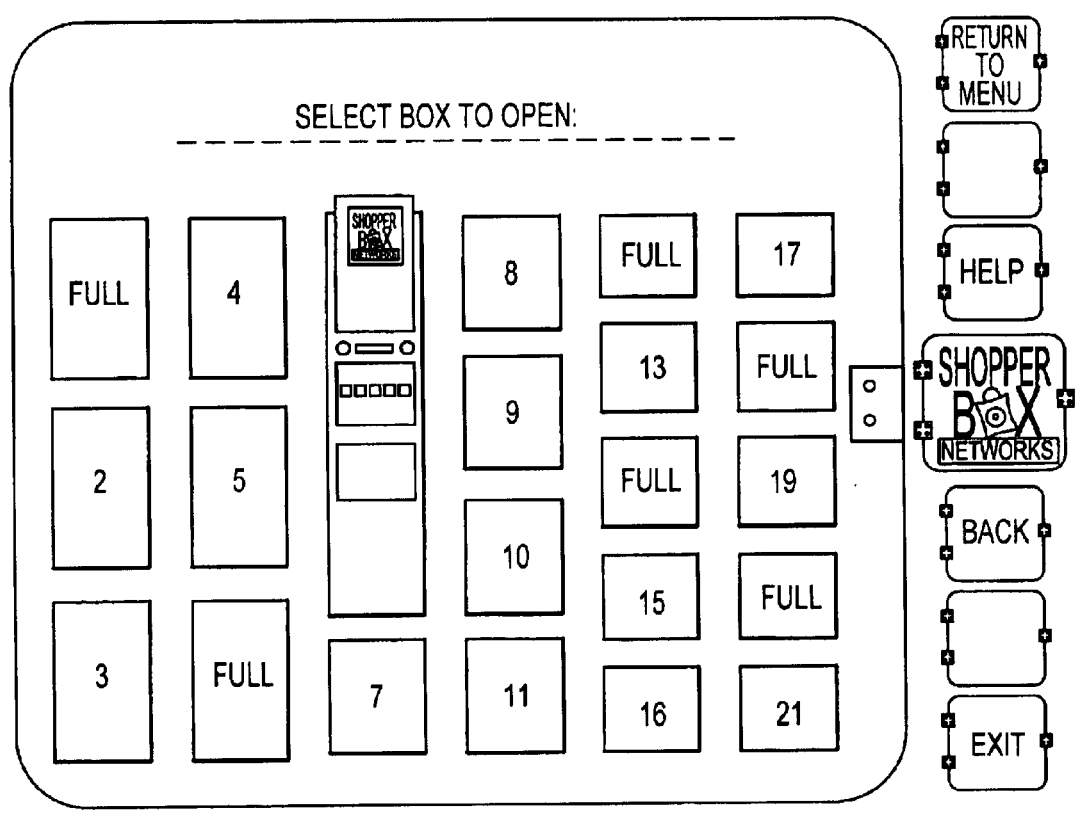

Upon selecting a shipment, the server then determines and presents to the user those lockers that are available, as shown in FIG. 7P. It is to be appreciated that the identification of available lockers may include those in which goods are actually located and/or empty lockers that were previously reserved by a user. The user then appropriately selects an available (i.e., not full) locker, preferably via a touch screen interface or a keypad/keyboard.

Figure 7Q:
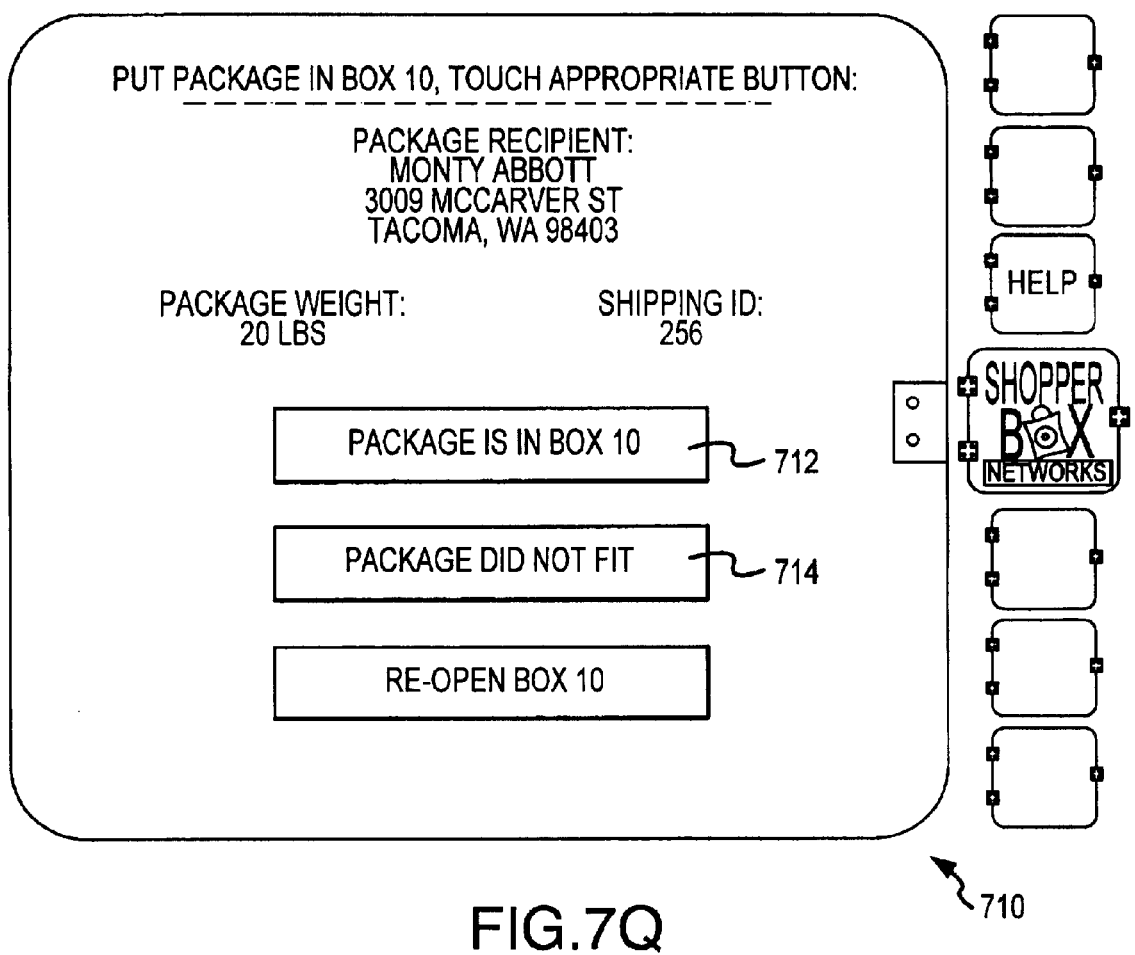
Figure 7R:
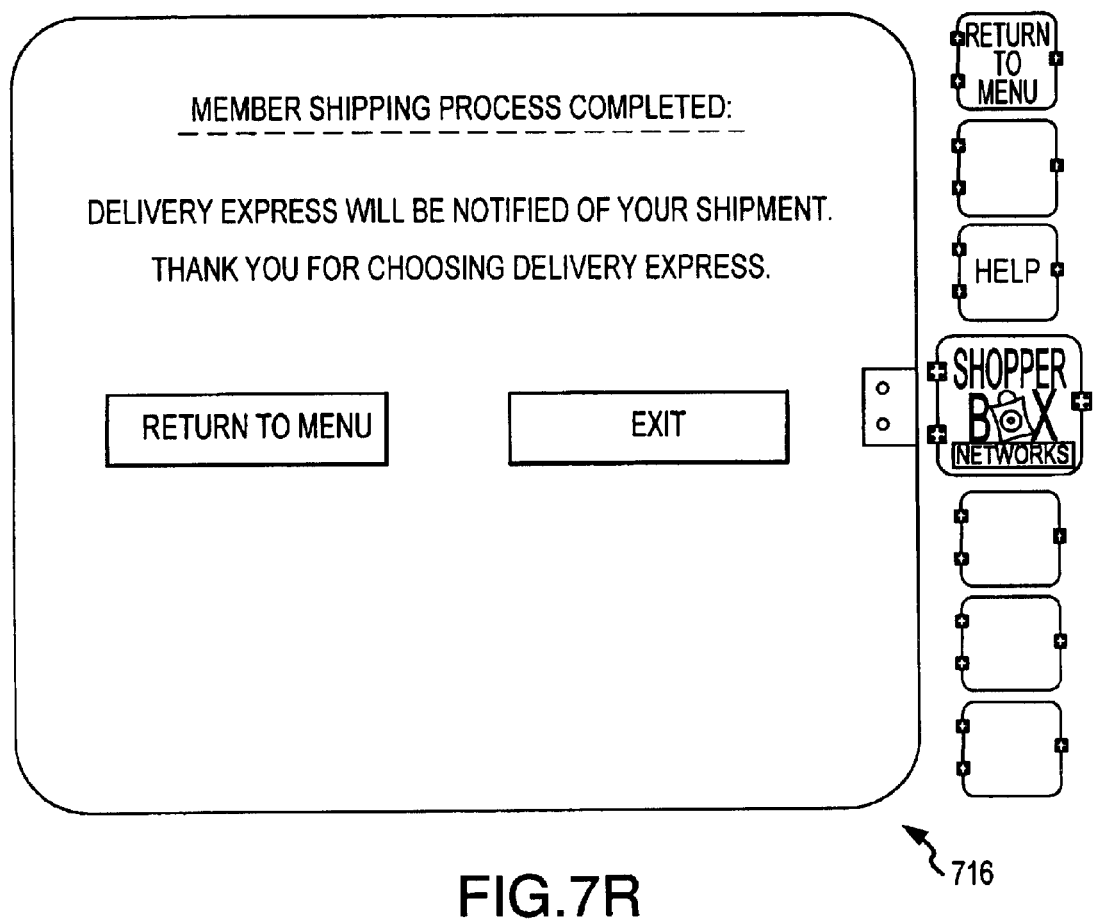

The server then returns the screen 710 shown in FIG. 7Q in which the user may designate whether the goods/package have been placed in the selected locker, whether the goods did not fit in the locker, or whether the user needs the locker to be reopened (for example, to insert additional goods). Upon the user selecting either the package is in the locker button 712 or the package did not fit button 714, the server present the completed process screen 716, as shown in FIG. 7R, via which the user may return to previous screens or exit. Thus, the system provides various screen displays and other user interfaces by which vendors, carriers, and customers may specify delivery and pick-up options for a specific good and/or a plurality of goods.

In order to provide the before mentioned features and functions, in one embodiment the system utilizes various software applications in addition to the previously mentioned hardware devices. As shown in FIG. 8, these software applications include the Kiosk application 802. This application 802 facilitates the interfaces between the user and the kiosk including any interfacing required between the server 816 (via the Internet 812) such as the touch screen displays, signature pads, magnetic strip card reader, payment interfaces, and the like. Additionally, the kiosk control application 804 controls interfacing between the kiosk and the server including locker access (i.e., unlocks/locks the lockers), and communications between the server and the kiosk. These applications 802, 804 in combination control the operations of the kiosk. Additionally, these applications interface with other, commercially available software applications and devices, in order to provide the before mentioned features and functions including, but not limited to, IE, Window Media Player Flash plug-ins, and others.

Further, the system also includes a web software application 806 (as discussed above with reference to FIG. 7), an administration web application 808 (which enables system administrators to schedule updates, perform routine system maintenance, monitor usage and other common tasks), and a customer service web application 810 (which facilitates customer support functions). All of these applications are preferably controlled and/or in communication with the server 816 via well known web servers/presentation servers 814 and a network, such as the Internet 812.

Lastly, while the present invention has been discussed herein with reference to various embodiments, especially embodiments involving multiple residential dwelling units and kiosks, it is to be appreciated that the present invention may be utilized in other applications. Such other applications include: utilizing the kiosk and lockers as temporary, password controlled storage lockers; utilizing the lockers in public places (for example, shopping malls, airports, bus and train stations, hotels, and ferry terminals) wherein important parcels are forwarded to a locker instead of being forwarded to a maitre'de or other hotel or facility employee. Similarly, lockers and kiosks need not be fixed installations. Mobile units, utilizing wireless connections and battery or solar power, may also be utilized. As such, the present invention is not to be construed as being limited to the various embodiments described herein and includes all embodiments, processes, systems and/or apparatus within the scope of the invention.

What is claimed is:

1. An apparatus for controlling access to a locker for storing goods, comprising:
   a processor;
   a user interface, connected to the processor, for establishing communications between a user and the processor;
   a network connection, connecting the processor with at least one locker used to store goods; and
   a communications interface, establishing a communications link between the processor and a server;
   a vending machine; and
   whereupon receipt of a request by a user, via the user interface, to gain access to a locker, the processor communicates the request to the server, and upon receipt of an approval from the server the processor directs the user, via the user interface to the locker to which access has been granted and unlocks a locking device securing access to the locker.

2. A system for delivering goods to and retrieving goods from a secure storage unit comprising:
- a locker, further comprising an interior in which at least one good may be inserted and a first door by which access to the interior may be obtained;
- a locking device attached to the locker and securing access to the interior of the locker via the first door;
- a server, in communication with the locker;
- a user interface, in communication with the server;
- whereupon receipt of a request from a user, via the user interface, to access the interior of the locker, a server determines whether the user is authorized to access the locker and when authorized directs the locking device to unlock the first door;
- wherein the system further comprises a controller, associated with the locker and in communication with the locker and the server; wherein the controller establishes the communications between the server and the locker and, based upon instructions received from the server, controls the operation of the locking device;
- wherein the controller and the user interface are located in a kiosk; and
- wherein the kiosk further comprises a vending machine.

3. The system of claim 2, wherein the vending machine dispenses at least one article of commerce.

4. The system of claim 2, wherein the locker further comprises one of a plurality of lockers in a storage unit.

5. The system of claim 2, wherein the locker further comprises at least one of a garage, a mailbox, a shipping container, a trailer, a box, a single compartment locker, a multiple compartment locker, a refrigerated locker, a heated locker, a video return locker, a self-sterilizing locker, and a clothing locker.

6. The system of claim 2, wherein the locker is utilized by a single user to send and receive goods.

7. The system of claim 2, wherein the locker is utilized by multiple users to send and receive goods.

8. The system of claim 7, wherein the locker is located at a private residence, an apartment complex, a business, a vendor facility, a customer facility, a carrier facility, a centralized location, a transit terminal, an airport, or a shopping mall.

9. The system of claim 2, wherein the locker further comprises a second door providing access to the interior of locker via the second door.

10. The system of claim 9, wherein the locker is attached to a building and the first door provides access to the interior of the locker from a location outside the building and the second door provides access to the interior of the locker from within the building.

11. The system of claim 10, wherein the server controls access to the interior of the locker via at least one of the first door and the second door.

12. The system of claim 2, wherein the locking device further comprises at least one of an electronically activated lock, a hydraulic lock, an electrical lock, a magnetic lock, an electro-magnetic lock, an electro-mechanical lock, and a mechanical lock.

13. The system of claim 2, wherein the server is in communication with a database containing data and content utilized by the server to control the operation of the locker and the locking device and access to the interior of the locker.

14. The system of claim 2, wherein the controller is in communication with the locker via at least one of a wired connection and a wireless connection.

15. The system of claim 14, wherein the wired connection further comprises an Ethernet connection.

16. The system of claim 14, wherein the wireless connection further comprises at least one established using infrared, satellite, and electromagnetic signals.

17. The system of claim 2, wherein the controller further comprises at least one of a personal computer, a programmable logic controller, a micro-processor, and a micro-controller.

18. The system of claim 2, wherein the controller further comprises a multi-tasking capable processor.

19. The system of claim 2, whereupon receipt of an input received from a user via the user interface, the controller communicates such inputs to the server; whereupon the server determines which of the at least one locker the user is to be provided access thereto and provides a response indicative of the determination to the controller, whereupon the controller commands the locking device to unlock those lockers to which the user is allowed access.

20. The system of claim 2, wherein the locker further comprises at least one sensor for detecting environmental conditions and security conditions, and communicates output signals from the at least one sensor to the controller; whereupon the controller monitors the output signals and generates an alarm when sensed conditions are other than desired.

21. The system of claim 2, wherein the user interface further comprises a user interface device.

22. The system of claim 21, wherein the user interface device further comprises a display monitor, a keyboard and a scanner.

23. The system of claim 22, wherein the scanner further comprises at least one of a retinal scanner, a fingerprint scanner, a voice scanner, a magnetic card reader, a signature pad, a bar code scanner, and an infrared data transceiver.

24. The system of claim 21, wherein the user interface device utilizes a wireless connection to communicate with the server.

25. The system of claim 2, wherein the user interface is provided on at least one of a personal data assistant and a DIAD board.

26. The system of claim 2, wherein the user interface is provided via a wireless connection with at least one of a personal data assistant, a personal computing device, and a carrier DIAD board.

27. The system of claim 2, wherein the customer is notified when a delivery of a good to a locker occurs.

28. The system of claim 27, wherein the notification occurs via at least one of an e-mail message, a page, a Short Message Service (SMS), a phone call, a facsimile, and web page message.

29. The system of claim 2, wherein the server is in communication with the kiosk via an Internet connection.

30. The system of claim 2, wherein the system further comprises a vendor's device, in communication with the server, wherein the vendor's device is utilized by a vendor to schedule a delivery of a good to the locker with the server.

31. The system of claim 2, wherein the system further comprises a consumer's device, in communication with the server, for receiving a notification when a delivery for a consumer to a locker has occurred.

32. The system of claim 31, wherein the consumer's device is utilized by a consumer to schedule a pickup, by at least one of a carrier, a second consumer, and a vendor, of a good inserted into a locker assigned by the server for the pick-up.

33. A method for delivering goods to a customer by a carrier at a locker, comprising:

entering a carrier id into a user verification device at a kiosk associated with a storage unit, the storage unit containing at least one secured locker controlled by a server via a controller;

whereupon the server receives the carrier id number and upon verification of the carrier id number by the server, determines to which customer the carrier is scheduled to deliver goods, and provides a listing of such customers to the carrier, and upon receipt of a selection of a customer by a carrier, directs the kiosk to unlock the locker; inserting the good into the locker; and notifying the server of the insertion of the good into the locker.

34. The method of claim 33, wherein the carrier id is entered into the user verification device using a scanner, the scanner being further comprised of at least one of a retinal scanner, a fingerprint scanner, a voice scanner, a magnetic card reader, a signature pad, a bar code scanner, and an infrared data transceiver.

35. The method of claim 33, wherein the kiosk is associated with the storage unit via a remote connection.

36. The method of 33, wherein the locker is pre-assigned by the server.

37. The method of claim 33, wherein the locker utilized by the carrier to insert the goods therein is dynamically allocated and the process further comprises:

receiving an identification of available lockers; and selecting an available locker;

whereupon selection of an available locker by the carrier, the server directs the kiosk to unlock the locker.

38. The method of claim 33, wherein the method for delivering goods to a customer further includes:

receiving an identification of the customer requesting the delivery;

determining a location of the locker to be utilized for the delivery of the good; and assigning the locker to the delivery.

39. The method of claim 33, wherein the determination of the locker to be utilized for the delivery of the goods utilizes at least one parameter selected from the group consisting of: a preferred locker preference, an alternative locker preference, a place of business, a residence address, a type of good to be shipped, a time constraint, and time of day.

40. The method of claim 33, wherein the method further comprises specifying whether a customer must sign for the good before access to the good is allowed.

41. The method of claim 33, wherein the method further comprises:

selecting an option to pick up a good to be delivered, wherein the good is located in a locker associated with the kiosk; and removing the good from the locker;

wherein the good was previously inserted into the locker by a customer upon establishing a shipment request with the server and obtaining access to the locker.

42. The method of claim 41, wherein notifying the customer of the delivery of the at least one good to the at least one locker further comprises sending at least one notification message selected from the group consisting of: a page, a telephone message, an e-mail, a Short Message Service (SMS), a written message, a facsimile, and a web page message.

43. The method of claim 41, further comprising notifying the server that the locker is available for subsequent use upon retrieval of the good from the locker by the customer.

44. The method of claim 43, further comprising processing the request via the server to determine at which locker the goods are to be delivered and delivering the goods to the locker identified by the server.

45. The method of claim 43, wherein the request is received via an internet connection between a consumer's device and the server.

46. The method of claim 43, wherein the request is received via a connection between a consumer's device and a vendor's device and the request is communicated to the server via a second connection between the vendor's device and the server.

47. The method of claim 33, further comprising notifying the customer of the delivery of the good.

48. The method of claim 43, wherein the method is initiated by a customer requesting delivery of goods to a locker.

* * * * *